United States Patent
Lee et al.

(10) Patent No.: US 9,984,007 B2
(45) Date of Patent: May 29, 2018

(54) STORAGE SYSTEM AND METHOD FOR PERFORMING AND AUTHENTICATING WRITE-PROTECTION THEREOF

(71) Applicants: Jaegyu Lee, Suwon-si (KR); Jisoo Kim, Seongnam-si (KR); Young-Jin Park, Incheon (KR); Bo-ram Shin, Suwon-si (KR)

(72) Inventors: Jaegyu Lee, Suwon-si (KR); Jisoo Kim, Seongnam-si (KR); Young-Jin Park, Incheon (KR); Bo-ram Shin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 246 days.

(21) Appl. No.: 14/631,349

(22) Filed: Feb. 25, 2015

(65) Prior Publication Data
US 2015/0278118 A1    Oct. 1, 2015

Related U.S. Application Data

(60) Provisional application No. 61/971,673, filed on Mar. 28, 2014.

(30) Foreign Application Priority Data

Sep. 4, 2014    (KR) .......................... 10-2014-0117786

(51) Int. Cl.
*G06F 12/00*    (2006.01)
*G06F 12/14*    (2006.01)
(Continued)

(52) U.S. Cl.
CPC ........ *G06F 12/145* (2013.01); *G06F 12/1441* (2013.01); *G06F 12/1466* (2013.01);
(Continued)

(58) Field of Classification Search
USPC ........................................................ 711/102
See application file for complete search history.

(56) References Cited

U.S. PATENT DOCUMENTS

| | | | |
|---|---|---|---|
| 3,937,925 A | * | 2/1976 | Boothroyd ............. B23K 10/02 235/379 |
| 7,177,975 B2 | | 2/2007 | Toombs et al. |

(Continued)

FOREIGN PATENT DOCUMENTS

KR    10-2014-0113134 A    9/2014

OTHER PUBLICATIONS

Jedec Standard, "Embedded MultiMediaCard(e•MMC) e•MMC/Card Product Standard, High Capacity, including Reliable Write, Boot, Sleep Modes, Dual Data Rate, Multiple Partitions Supports, Security Enhancement, Background Operation and High Priority Interrupt (MMCA, 4.41)", JESD84-A441, March 2010, 234pgs.

(Continued)

*Primary Examiner* — Mardochee Chery
(74) *Attorney, Agent, or Firm* — Harness, Dickey & Pierce, P.L.C.

(57) ABSTRACT

In one embodiment, the method includes receiving, at a storage device, a request. The request includes a request message authentication code and write protect information. The write protect information includes at least one of start address information and length information. The start address information indicates a logical block address at which a memory area in a non-volatile memory of the storage device starts, and the length information indicates a length of the memory area. The method also includes generating, at the storage device, a message authentication code based on (1) at least one of the start address information and the length information, and (2) a key stored at the storage device; authenticating, at the storage device, the request based on the generated message authentication code (Continued)

and the request message authentication code; and processing, at the storage device, the request based on a result of the authenticating.

18 Claims, 16 Drawing Sheets

(51) Int. Cl.
    *G06F 11/14*     (2006.01)
    *G06F 11/10*     (2006.01)

(52) U.S. Cl.
    CPC ...... *G06F 11/1072* (2013.01); *G06F 11/1441* (2013.01); *G06F 2212/1052* (2013.01)

(56) References Cited

U.S. PATENT DOCUMENTS

| | | | |
|---|---|---|---|
| 8,296,467 B2 | 10/2012 | Lee et al. | |
| 8,392,683 B1 | 3/2013 | Confalonieri | |
| 8,452,934 B2 | 5/2013 | Jogand-Coulomb et al. | |
| 8,473,671 B2 | 6/2013 | Maeda et al. | |
| 8,621,620 B2 | 12/2013 | Sallam | |
| 8,862,809 B2* | 10/2014 | Zettsu | G06F 12/02 |
| | | | 711/103 |
| 2001/0016887 A1 | 8/2001 | Toombs et al. | |
| 2003/0163695 A1* | 8/2003 | Irisawa | G06F 21/31 |
| | | | 713/170 |
| 2006/0101301 A1* | 5/2006 | Nagao | G11C 7/20 |
| | | | 713/600 |
| 2006/0262441 A1* | 11/2006 | Kuhar | B82Y 10/00 |
| | | | 360/1 |
| 2008/0250509 A1 | 10/2008 | Ahvenainen | |
| 2010/0153672 A1 | 6/2010 | Jogand-Coulomb et al. | |
| 2011/0066837 A1 | 3/2011 | Lee et al. | |
| 2012/0036313 A1 | 2/2012 | Ito et al. | |
| 2012/0110249 A1 | 5/2012 | Jeong et al. | |
| 2012/0191905 A1 | 7/2012 | Maeda et al. | |
| 2012/0208619 A1 | 8/2012 | Canterbury et al. | |
| 2012/0254982 A1 | 10/2012 | Sallam | |
| 2012/0255017 A1 | 10/2012 | Sallam | |
| 2013/0159727 A1 | 6/2013 | Sarangdhar et al. | |
| 2013/0262810 A1 | 10/2013 | Chang | |
| 2013/0268778 A1 | 10/2013 | Maeda et al. | |
| 2014/0281170 A1 | 9/2014 | Cho et al. | |
| 2015/0242331 A1* | 8/2015 | Van Winkelhoff | G11C 7/20 |
| | | | 711/163 |

OTHER PUBLICATIONS

Jedec Standard, "Embedded MultiMediaCard(e•MMC)Electrical Standard (5.0)", JESD84-B50, Sep. 2013, 296pgs.

* cited by examiner

STORAGE SYSTEM AND METHOD FOR PERFORMING AND AUTHENTICATING WRITE-PROTECTION THEREOF

CROSS-REFERENCE TO RELATED APPLICATIONS

A claim for priority under 35 U.S.C. § 119 is made to U.S. Provisional Patent Application No. 61/971,673, Mar. 28, 2014 and Korean Patent Application No. 10-2014-0117786 filed Sep. 4, 2014, in the Korean Intellectual Property Office, the entire contents of which are hereby incorporated by reference.

BACKGROUND

The inventive concepts described herein relate to a storage system, and more particularly, relate to a storage system and a write-protection method thereof.

A storage system includes a host and a storage device. The host and the storage device are connected through a variety of standardized interfaces, such as a serial ATA (SATA), universal flash storage (UFS), a small computer small interface (SCSI), a serial attached SCSI (SAS), and an embedded MMC (eMMC).

In a conventional storage device, anyone sets and releases write protection by means of a predetermined command. A type of the write protection is also set by a command. In addition, even though the write protection is set, anyone can release the write protection or change the setting of the write protection.

Write-protected, for example, is a boot loader or a kernel image of an operating system. Since anyone releases the write protection or changes its setting, the boot loader or the kernel image is exposed to dangerous, unallowed access, such as rooting.

SUMMARY

At least one embodiment is directed to a non-transitory computer readable medium.

In one embodiment, the non-transitory computer readable medium stores a data structure that controls a write protection operation of a storage device during execution of the write protection operation for a non-volatile memory in the storage device, the data structure including a memory partition identifier identifying a partition of the non-volatile memory, start address information indicating a logical block address for a memory area in the identified memory partition, and length information indicating a length of the memory area in the identified memory partition; and the data structure including type information instructing the storage device on a type of write protection to provide the memory area for the write protection operation.

In one embodiment, if the length information is a reference value, the length information indicates to apply write protection to an entirety of the identified memory partition.

In one embodiment, the data structure further includes writable information indicating whether to apply write protection to the memory area.

In one embodiment, the type information indicates a type selected from a group including at least a first type, the first type indicates that the writable information may be changed once after each power on of the memory, and that the writable information indicates to apply write protection at the powering on of the memory.

In one embodiment, the group includes the first type, a second type and a third type; the second type indicates that the writable information may be changed, and that the writable information indicates no application of write protection after the powering on of the memory; and the third type indicates that the writable information may be changed.

At least one embodiment relates to a storage device.

In one embodiment, the storage device includes a first memory. The first memory is a non-volatile memory. The memory device also includes a second memory configured to store a memory partition identifier identifying a partition of the first memory, start address information indicating a logical block address for a memory area in the identified memory partition, and length information indicating a length of the memory area in the identified memory partition. The second memory is configured to store writable information in association with the start address information and the length information. The writable information indicates whether to apply write protection to the memory area.

In one embodiment, the second memory is configured to store type information in association with the start address information and the length information, where the type information indicates a type of write protection to provide the memory area.

At least one embodiment relates to a method.

In one embodiment, the method includes receiving, at a storage device, a request. The request includes a request message authentication code and write protect information. The write protect information includes at least one of start address information and length information. The start address information indicates a logical block address at which a memory area in a non-volatile memory of the storage device starts, and the length information indicates a length of the memory area. The method also includes generating, at the storage device, a message authentication code based on (1) at least one of the start address information and the length information, and (2) a key stored at the storage device; authenticating, at the storage device, the request based on the generated message authentication code and the request message authentication code; and processing, at the storage device, the request based on a result of the authenticating.

In one embodiment, the write protection information includes both the start address information and the length information; and the generating generates the generated message authentication code based on the start address information, the length information and the key.

In one embodiment, the write protection information includes the start address information, the length information and a partition identifier. The partition identifier identifies a partition in the non-volatile memory of the storage device, and the partition includes the memory area. Also, the generating generates the generated message authentication code based on the start address information, the length information, the partition identifier and the key.

In one embodiment, the write protection information includes the start address information, the length information, the partition identifier, and writable information indicating whether to apply write protection to the memory area; and the generating generates the generated message authentication code based on the start address information, the length information, the partition identifier, the writable information and the key.

In one embodiment, the write protection information includes the start address information, the length information, the partition identifier, the writable information, and type information indicating a type of write protection to provide the memory area; and the generating generates the generated message authentication code based on the start address information, the length information, the partition identifier, the writable information, the type information and the key.

In one embodiment, the type information indicates a type selected from a group including at least a first type, where the first type indicates that the writable information may be changed once after power on of the memory, and that the writable information indicates to apply write protection at the powering on of the memory.

In one embodiment, the group includes the first type, a second type and a third type. The second type indicates that the writable information may be changed, and that the writable information indicates no application of write protection after the powering on of the memory. The third type indicates that the writable information may be changed.

In one embodiment, the generating generates a hash-based message authentication code.

In one embodiment, the authenticating authenticates the request if the generated message authentication code matches the request message authentication code; and the processing processes the request if the request is authenticated.

In one embodiment, the request requests the storage device to update the write protection information with information included in the request.

In one embodiment, the processing includes incrementing an update counter if the processing processes the request; and sending a response message if the processing processes the request. The response message includes a count value of the update counter.

In one embodiment, the processing includes sending a response message in response to the request if the processing processes the request.

In one embodiment, the processing includes storing the write protection information.

In a further embodiment, the method includes receiving, at a storage device, a write command to write data to a first area of a non-volatile memory in the storage device; and determining, at the storage device, whether to process the write command based on stored write protection information for one or more memory areas covered by the first area, for each memory area. The write protection information includes start address information indicating a logical block address of a start of the memory area, length information indicating a length of the memory area, and writable information indicating whether to apply write protection to the memory area.

In one embodiment, the determining determines not to process the write command if the first area overlaps one of the memory areas having associated writable information indicating to apply write protection.

In one embodiment, the determining determines the first area overlaps one of the memory areas if an address associated with the write command falls within one of the memory areas.

In one embodiment, for each memory area, the write protection information further includes a partition identifier, the partition identifier identifying a partition in the non-volatile memory, the partition including the memory area. If the length information is set to a reference value, the length information indicates an entirety of the identified partition is write protected. The determining determines not to process the write command if the first area overlaps one of the memory areas having associated length information set to the reference value.

In another embodiment, the method includes storing write protection information for a memory area of a non-volatile memory. The write protection information includes writable information and type information. The writable information indicates whether to apply write protection to the memory area, and the type information indicates a type selected from a group including at least a first type. The method further includes permitting changing the writable information once after each power on of the memory if the type information is the first type; and setting the writable information to indicate to apply write protection after power on of the memory if the type information is the first type.

In yet another embodiment, the method includes sending a request to a storage device, where the request requests that the storage device update write protection information for a memory area of a non-volatile memory in the storage device. The request includes write protection information. The write protection information includes start address information indicating a logical block address of a start of the memory area, length information indicating a length of the memory area, and writable information indicating whether to apply write protection to the memory area.

Yet another embodiment relates to a storage device.

In one embodiment, the storage device includes a non-volatile memory and a controller. The controller is configured to receive a request. The request includes a request message authentication code and write protect information. The write protect information includes at least one of start address information and length information. The start address information indicates a logical block address at which a memory area of the non-volatile memory starts, and the length information indicating a length of the memory area. The controller is configured to generate a message authentication code based on (1) at least one of the start address information and the length information, and (2) a key stored at the storage device. The controller is configured to authenticate the request based on the generated message authentication code and the request message authentication code; and the controller is configured to process the request based on a result of the authenticating.

In another embodiment, the storage device includes a non-volatile memory and a controller. The controller is configured to receive a write command to write data to a first area of a non-volatile memory in the storage device, and to determine whether to process the write command based on stored write protection information for one or more memory areas covered by the first area. For each memory area, the write protection information includes start address information indicating a logical block address of a start of the memory area, length information indicating a length of the memory area, and writable information indicating whether to apply write protection to the memory area.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
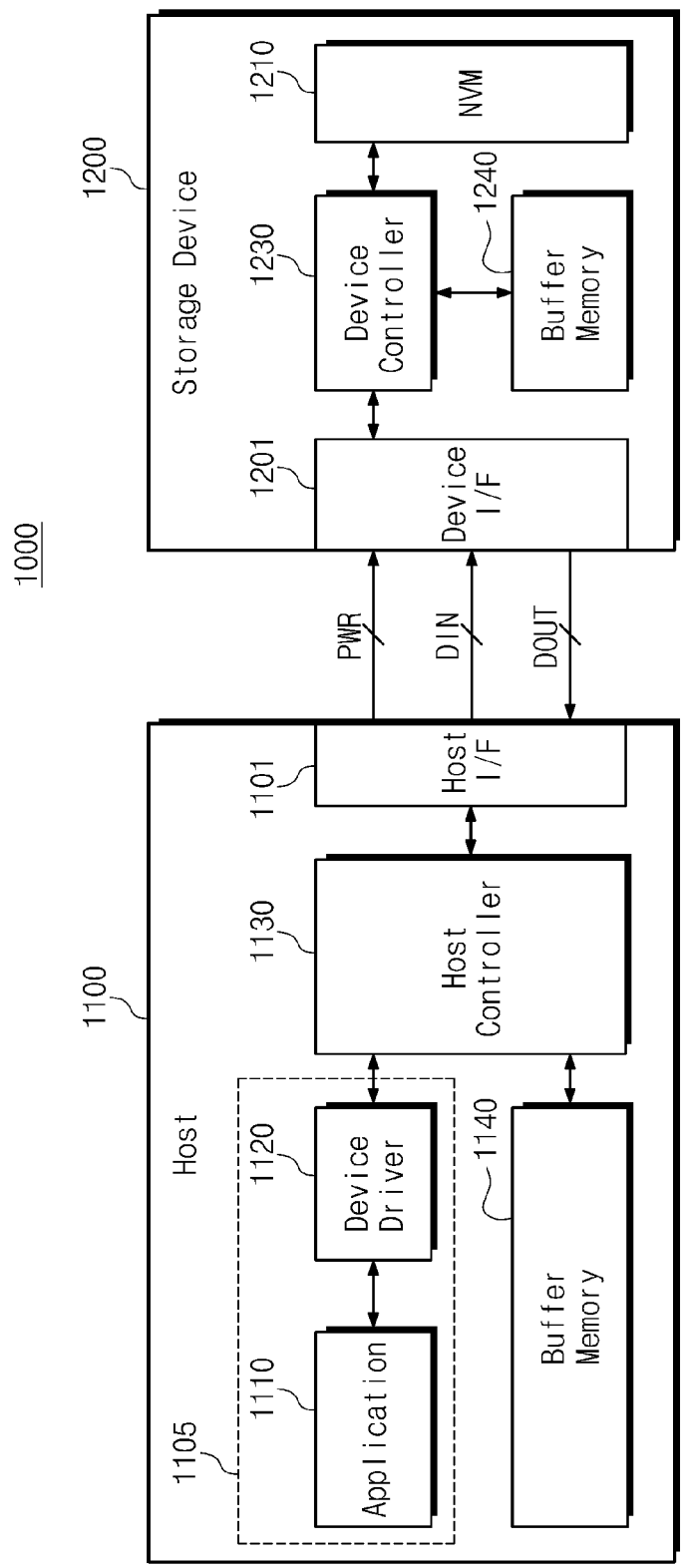
FIG. 1 is a block diagram schematically illustrating a storage system.

Embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concepts of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "example" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a storage system. Referring to FIG. 1, a storage system 1000 contains a host 1100 and a storage device 1200. The host 1100 and the storage device 1200 may be connected through a variety of standardized interfaces, such as a serial ATA (SATA), universal flash storage (UFS), a small computer small interface (SCSI), a serial attached SCSI (SAS), and an embedded MMC (eMMC).

As illustrated in FIG. 1, a host interface 1101 and a device interface 1201 are connected through data lines DIN and DOUT for exchanging data or signals and a power line PWR for providing a power. The host 1100 includes a processor 1105, a host controller 1130, and a buffer memory 1140.

The processor 1105 executes an application program 1110 and a device driver 1120. The application program 1110 may be one of various application programs to be executed by the host 1100. The device driver 1120 may drive peripheral devices that are used through connection with the host 1100, and may drive the storage device 1200, for example. The application 1110 and the device driver 1120 may be separate software modules that are stored and/or loaded into the buffer memory 1140. In an alternative embodiment, hardware logic circuits configured by the application program 1110 and the device driver 1120 as firmware may replace the processor 1105. As a further alternative, a combination of a processor and hardware logic circuits may be used. In yet another embodiment, the processor 1105 and/or hardware logic circuits may be internal to the host controller 1130 instead of external. The host controller 1130 exchanges data with the storage device 1200 through the host interface 1101. In one embodiment, the host controller 1130 includes one or more central processing units (CPUs). In an alternative embodiment, the host controller 1130 may include hardware logic circuits configured by firmware. In yet another embodiment, the host controller 1130 may be combination of CPU(s) and hardware logic circuits.

The buffer memory 1140 is used as a main memory and/or a cache memory of the host 1100, and is also used as a driving memory for driving software, such as the application 1110 or the device driver 1120.

The storage device 1200 is connected to the host 1100 through the device interface 1201. The storage device 1200 includes a nonvolatile memory 1210, a device controller 1230, and a buffer memory 1240. The nonvolatile memory 1210 may include the following: flash memory, MRAM, PRAM, FeRAM, etc. The device controller 1230 controls an overall operation of the nonvolatile memory 1210 including a write operation, a read operation, an erase operation, etc. The device controller 1230 may include one or more programmed CPUs, configured hardware logic circuits, or a combination thereof. The device controller 1230 exchanges an address with the nonvolatile memory 1210 or the buffer memory 1240 or data with the nonvolatile memory 1210 or the buffer memory 1240 through a data bus.

The buffer memory 1240 may be used to temporarily store data read from the nonvolatile memory 1210 or to be stored therein. The buffer memory 1240 may be implemented with a volatile memory or a nonvolatile memory. The buffer memory 1240 may be embedded in the device controller 1230 or may be integrated along with the device controller 1230.

The storage system 1000 shown in FIG. 1 is applicable to a mobile device or any other electronic device that is based on a flash memory. Below, universal flash storage (UFS) may be an example to describe a configuration and an operating method of the storage system 1000 shown in FIG. 1.

Figure 2:
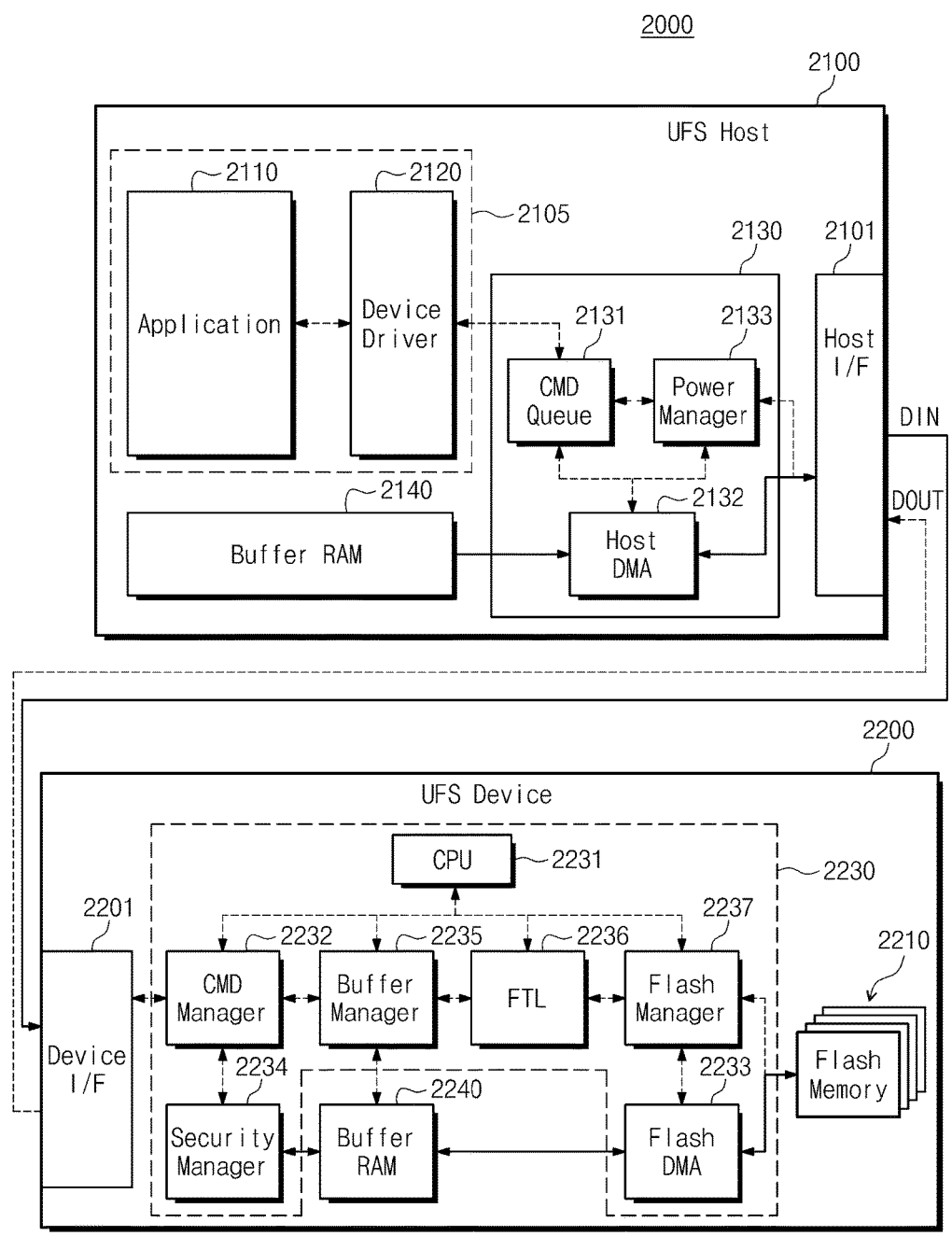
FIG. 2 is a block diagram schematically illustrating a flash memory-based UFS system.

FIG. 2 is a block diagram schematically illustrating a flash memory-based UFS system. Referring to FIG. 2, an UFS system 2000 includes an UFS host 2100 and an UFS device 2200.

The UFS host 2100 includes a processor 2105, a host controller 2130, and a buffer RAM 2140. The processor 2105 executes application programs 2110 and device drivers 2120. The application program 2110 may be one of various application programs to be executed by the host 2100. The device drivers 2120 may drive peripheral devices that are used through connection with the host 2100, and may drive the UFS device 2200, for example. The application 2110 and the device driver 2120 may be separate software modules that are stored and/or loaded into the buffer RAM 2140. In an alternative embodiment, hardware logic circuits configured by the application program 2110 and the device driver 2120 as firmware may replace the processor 2105. As a further alternative, a combination of a processor and hardware logic circuits may be used. In yet another embodiment, the processor 2105 and/or hardware logic circuits may be internal to the host controller 2130 instead of external. The host controller 2130 exchanges data with the UFS device 2200 through the host interface 2101. The host controller 2130, same as host controller 1130, may include one or more CPUs, hardware logic circuits or a combination thereof. As shown in FIG. 2, the host controller 2130 is configured to include a command queue 2131, a host DMA 2132, and a power manager 2133. Commands (e.g., a write command) generated by the controller 2130 executing the UFS application 2110 and the device driver 2120 are managed by the command queue 2131 of the host controller 2130. The command queue 2131 sequentially manages commands to be provided to the UFS device 2200. Provided to the host DMA 2132 are the commands that are stored in the command queue 2131. The host DMA 2132 sends the commands to the UFS device 2200 through a host interface 2101.

The UFS device 2200 includes a flash memory 2210, a device controller 2230, and a buffer RAM 2240. The device controller 2230 includes one or more programmed CPUs, configured hardware logic circuits or a combination thereof. As configured, the host controller 2230 includes a command manger 2232, a flash DMA 2233, a security manager 2234, a buffer manager 2235, a flash translation layer (FTL) 2236, and a flash manager 2237.

A command transferred from the UFS host 2100 to the UFS device 2200 is provided to the command manager 2232 through a device interface 2201. The command manager 2232 analyzes a command provided from the UFS host 2100, and authenticates the command by means of the security manager 2234. The command manager 2232 allocates the buffer RAM 2240 so as to receive data through the buffer manager 2235. Being ready to transfer data, the command manager 2232 sends RTT (READY-_TO_TRANSFER) UPIU to the UFS host 2100. A packet based on the UFS standard is referred to UPIU.

The UFS host 2100 sends data to the UFS device 2200 in response to the RTT UPIU. The data is sent to the UFS device 2200 through the host DMA 2132 and the host interface 2101. The UFS device 2200 stores the received data in the buffer RAM 2240 through the buffer manager 2235. The data stored in the buffer RAM 2240 is provided to the flash manger 2237 through the flash DMA 2233. The flash manager 2237 stores data at a selected address of the flash memory 2210, based on address mapping information of the FTL 2236.

If a data transfer operation and a program operation for a command are completed, the UFS device 2200 may send a response signal to the UFS host 2100 through an interface and may inform the UFS host 2100 of command completion. The UFS host 2100 informs the device driver 2120 and the application 2110 executing on the host controller 2130 of whether a command corresponding to the response signal is processed, and then terminates an operation on the command.

Providing reliability and security when the UFS system 2000 is used in a mobile device involves setting and releasing write protection data. The UFS system 2000 according to an embodiment of the inventive concepts may authenticate a command by means of Key-ed Crypto Hash, private key, and request count.

The inventive concepts may set or release the write protection through an authentication procedure or may change an attribute or type of the write protection. Also, the inventive concepts may appoint a write-protection area by a unit of a logical block address LBA of a host 2100.

I. WP (Write-Protect) Descriptor's Structure

Figure 3:
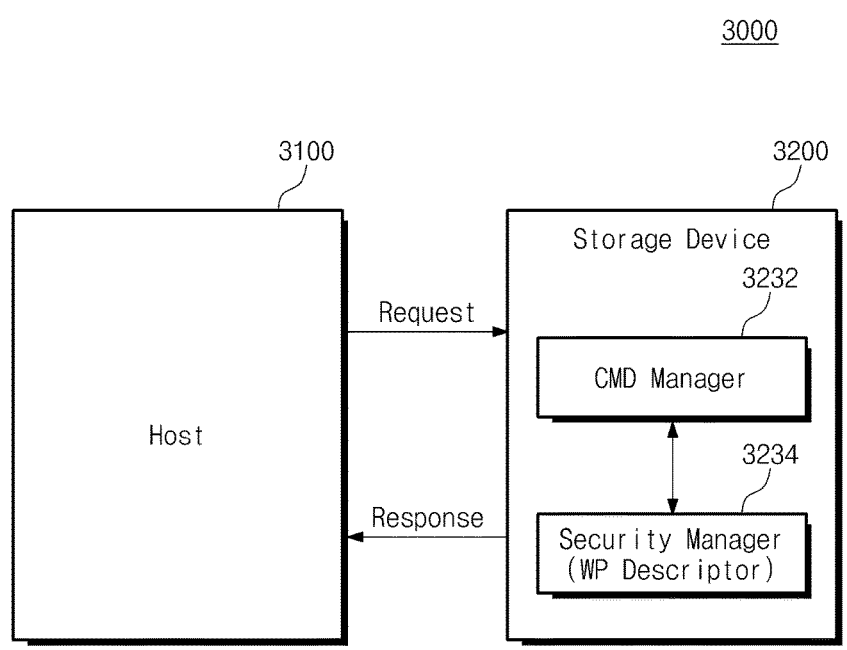
FIG. 3 is a block diagram schematically illustrating a storage system according to an embodiment of the inventive concepts.

FIG. 3 is a block diagram illustrating another embodiment of the inventive concepts. In one embodiment, the host 3100 may be the same as the host 2100. The storage device 3200 may be the same as the storage device 2200. In another embodiment, the storage device 3200 may have the hardware configuration shown in FIG. 12.

Figure 12:
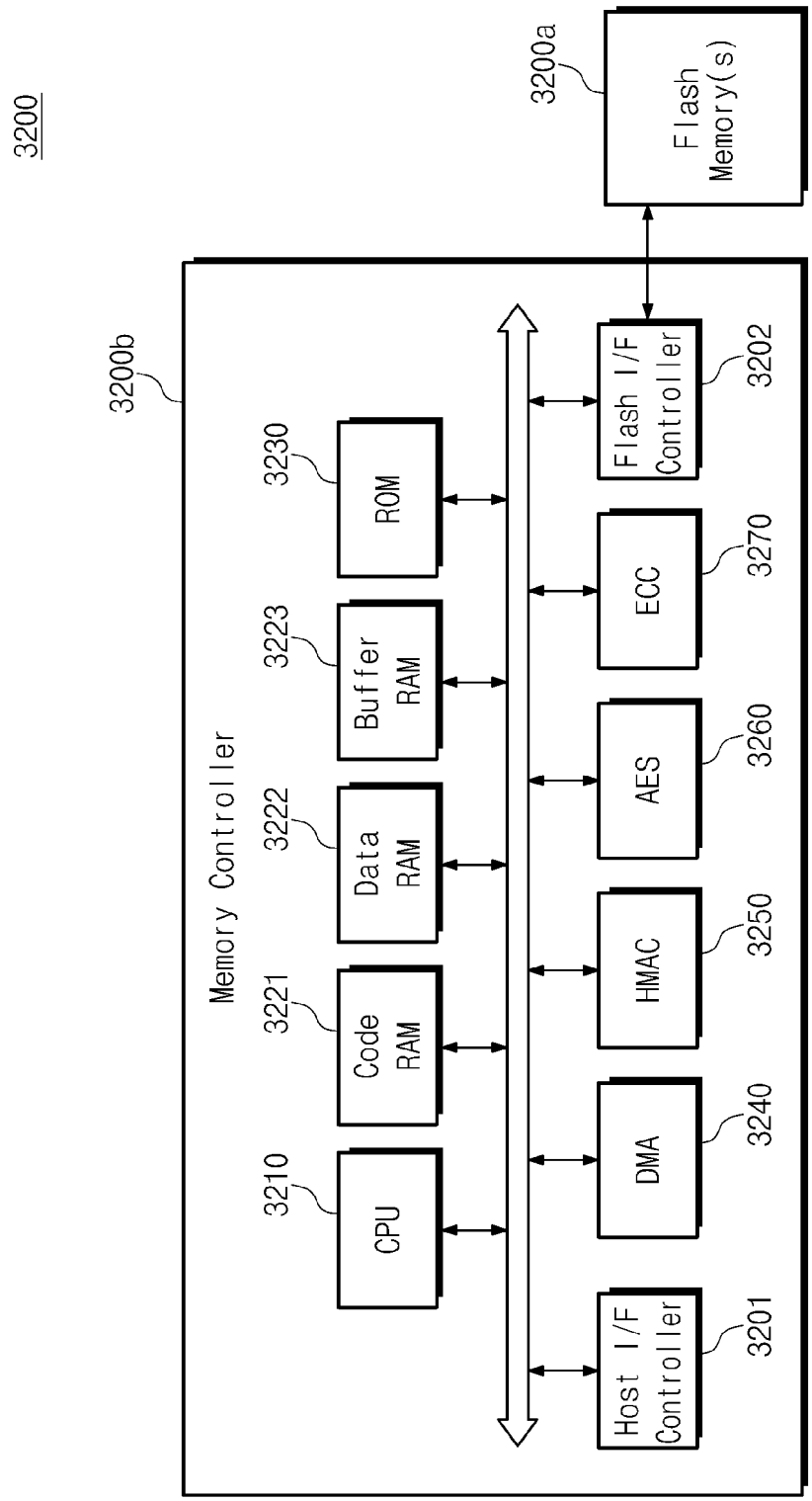
FIG. 12 is a block diagram schematically illustrating a hardware configuration of a storage device based on a flash memory shown in FIG. 3.
Figure 13:
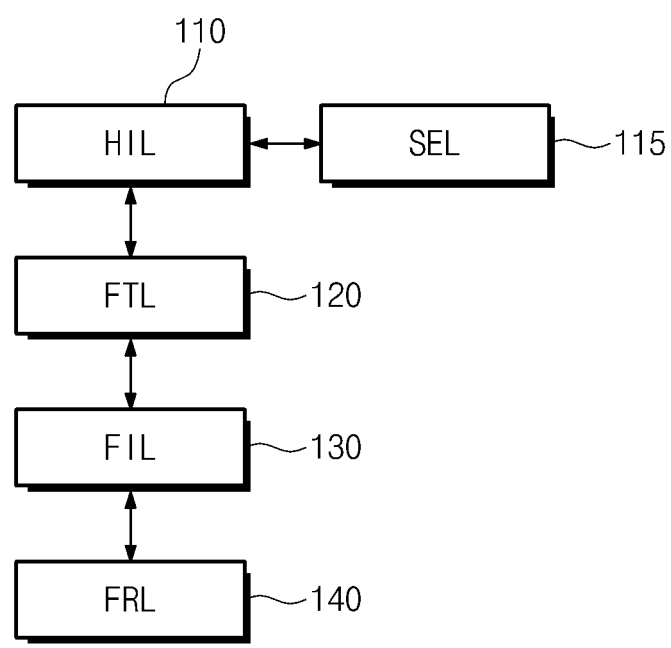
FIG. 13 is a block diagram schematically illustrating a software layer structure.

FIG. 12 is a block diagram schematically illustrating a hardware configuration of a storage device based on a flash memory-based UFS system shown in FIG. 3. FIG. 13 is a block diagram schematically illustrating a software layer structure executed by the CPU 3210 in the memory controller 3200b of the storage device 3200.

Referring to FIG. 12, the storage device 3200 contains a flash memory 3200a and a memory controller 3200b. The memory controller 3200b is connected to the host 3100 through a host interface controller 3201 and to the flash memory 3200a through a flash interface controller 3202. The memory controller 3200b contains a central processing unit (CPU) 3210, a code RAM 3221, a data RAM 3222, a buffer RAM 3223, a ROM 3230, a direct memory access (DMA) 3240 for directly accessing a memory, hash-based message authentication code (HMAC) 3250 for data security, AES (Advanced Encryption Standard) 3260, and ECC (error corrections coding) 3270 for correcting data errors. The DMA 3240, the HMAC 3250, the AES 3260 and the ECC 3270 are hardware logic circuits.

The CPU 3210 controls an overall operation of the memory controller 3200b. For example, at booting, the CPU 3210 loads a boot code stored in the flash memory 3200a or the ROM 3230 on the code RAM 3221 to control the booting of the storage device 3200.

Referring to FIG. 13, a software layer structure of the storage device 3200 includes a host interface layer (HIL) 110, a security layer (SEL) 115, a flash translation layer (FTL) 120, a flash interface layer (FIL) 130, and a flash recovery layer (FRL) 140.

Based on the host interface layer (HIL) 110, the CPU 3210 may control operations of receiving data from a host through the host interface controller 3201 and storing the received data at the data RAM 3221. The HIL 110 may include the command manager 3232. When exchanging data with the host, the CPU 3210 uses the security layer (SEL) 115 to authenticate a host command and set an area to be write-protected. The security layer (SEL) 115 may include the security manager 3234.

Based on the flash interface layer (FIL) 130, the CPU 3210 provides data stored at the data RAM 3222 or the buffer RAM 3223 to the flash memory 3200a through the flash interface controller 3202. The CPU 3210 manages address mapping of the flash memory 3200a, depending on the flash translation layer (FTL) 120. The CPU 3210 manages a recovery operation of the flash memory 3200a, depending on the flash recovery layer (FRL) 140.

The WP descriptor is stored at a nonvolatile memory, such as a flash memory 2210 or 3200a, or a ROM (not shown), and is loaded onto a volatile memory, such as a DRAM or an SRAM (e.g., buffer RAM 2240 or 3223), at power-on. The WP descriptor is used to set or release the write protection or to change an attribute of the write protection.

The following table 1 shows a structure and a description of the WP descriptor.

TABLE 1

| Name | | Description |
|---|---|---|
| PID (Partition ID) | | Partition ID for application of write protection |
| Start LBA | | Start address for write protection |
| Length | | Size to be write-protected. If length is '0', the whole partition is write-protected. |
| Writable | | Whether to apply write protection with True/False |
| Type | P | Maintain write protection until power-off or hardware (HW) reset. Always change Writable into True after power-on. If False, remains False until HW reset or power-on. |
| Type | NV-P | Always change Writable to False after power-off or HW reset even though Writable is changed and applied by request. |
| Type | NV | Change Writable only by request. |

Referring to the table 1, the WP descriptor consists of 'partition ID' (PID), 'start LBA', 'length', 'writable', and 'type'. The partition ID (PID) is used to identify a partition of the flash memory to be write-protected. The start LBA denotes a start address of a logical block to be write-protected. The length means the size of an area to be write-protected.

Figure 4:
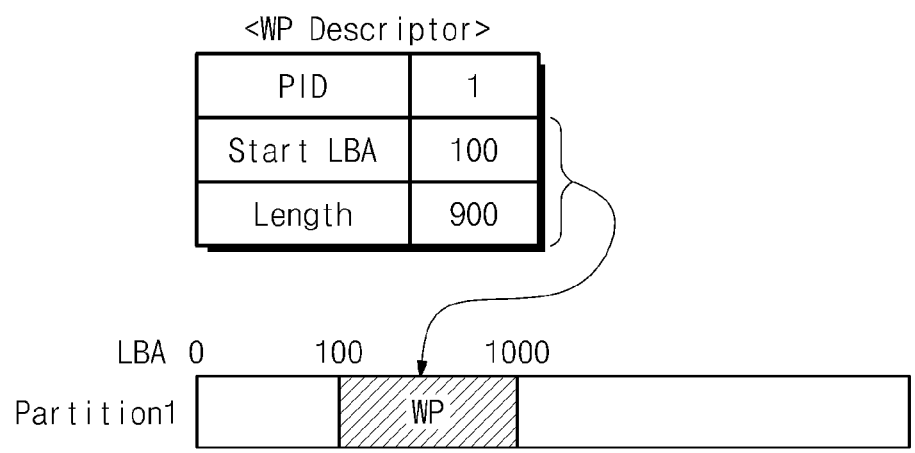
FIG. 4 is a conceptual diagram showing an embodiment where a write-protection area is appointed by the logical block address provided by a host.

FIG. 4 is a conceptual diagram showing an embodiment where a write-protection area is defined in part by the logical block address of a host. Referring to FIG. 4, a partition ID is '1'. That is, a first partition is identified. A start LBA and a length of a WP Descriptor are '100' and '900', respectively. Thus, the write-protection area starts from LBA 100 and ends at LBA 1000. Namely, the start LBA and length define the memory area of the partition, which may be write protected.

Figure 5:
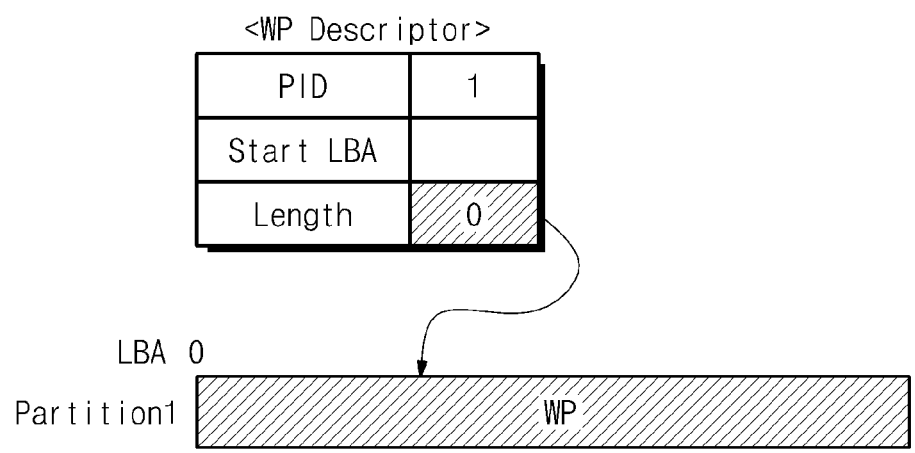
FIG. 5 is a conceptual diagram showing an embodiment where a whole partition of a storage device is write-protected.

FIG. 5 is a conceptual diagram showing an embodiment where the whole partition is write-protected. Referring to a table 1, when the length of a WP descriptor is set to '0', the whole partition is write-protected. In an embodiment shown in FIG. 5, a partition ID and a length of a WP descriptor are '1' and '0', respectively. Thus, the whole partition 1 is write-protected.

Referring to the table 1, 'Writable' denotes whether write protection is applied. 'Writable' may be set to 'True' or 'False'. An area where 'Writable' is set to 'True' is writable, and not write-protected. An area where 'Writable' is set to 'False' is write-protected.

Referring to the table 1, the write protection is divided into three types. A 'P' type is a type where the write protection is maintained until power-off or hardware reset. After power-on, 'Writable' is always changed to 'True'. When set to 'False', 'Writable' is not changed until power-off or hardware reset. A 'NV' type is a type where 'Writable' is only changed by a request of a host 2100 or 3100. A 'NV-P' type is a type where 'Writable' is changed by a request of the host 2100 or 3100. However, when a WP descriptor is set to the 'NV-P' type, 'Writable' is always changed to 'False' after power-off or hardware reset.

Figure 6:
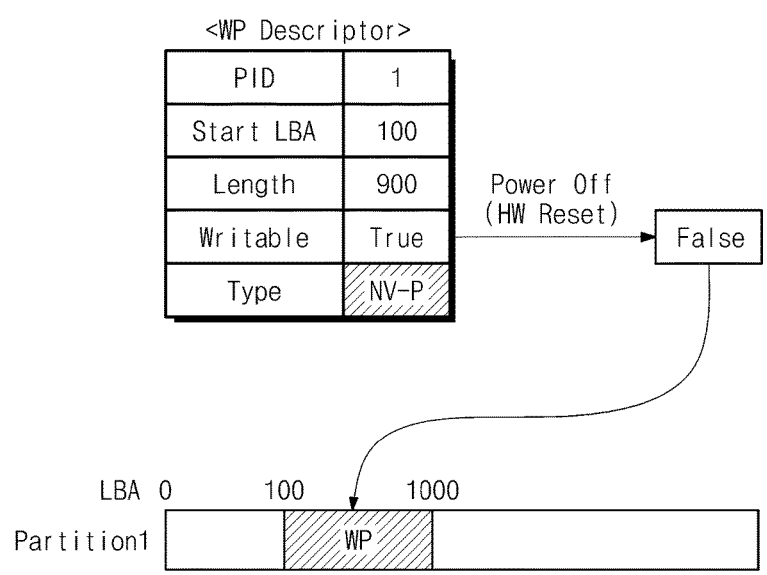
FIG. 6 is a conceptual diagram showing an embodiment where a write-protect (WP) descriptor is set to a 'NV-P' type.

FIG. 6 is a conceptual diagram showing an embodiment where a WP descriptor is set to a 'NV-P' type. Referring to FIG. 6, 'partition ID' (PID), 'Start LBA', 'Length', 'Writable', and 'Type' of a WP descriptor are set to '1', '100', '900', 'True', and NV-P', respectively. At power-off or hardware reset of a storage system 2000 or 3000, 'Writable' is changed to 'False' because the WP descriptor is set to the 'NV-P' type. When write-protected, an area (from LBA 100 to LBA 1000) is not writable.

The following table 2 shows an example of initial values of the WP descriptor shown in FIG. 3 for discussion purposes. The WP descriptor may be set with values shown in the table 2 as a default state.

TABLE 2

| PID (Partition ID) | Start LBA | Length | Writable | Type |
|---|---|---|---|---|
| 1 | 0 | 0 | True | P |
| 2 | 0 | 0 | True | P |
| 3 | 0 | 0 | True | P |
| ... | ... | ... | ... | ... |
| n | 0 | 0 | True | P |

Referring to the table 2, a storage area of a storage device 2200 or 3200 is divided into n partitions. Start LBAs and sizes of the partitions PID1 through PIDn are set to '0'. The whole partition is write-protected because a length is set to '0'. In each of the partitions PID1 through PIDn, 'Writable' is set to 'True' and a type is set to 'P'.

The following table 3 shows an example, for discussion purposes, of a configuration of a WP descriptor at a point in time when a storage system 2000 or 3000 is operating.

TABLE 3

| PID (Partition ID) | Start LBA | Length | Writable | Type |
|---|---|---|---|---|
| 1 | 0 | 5000 | False | P |
| 2 | 0 | 4000 | True | NV-P |
| 3 | 9000 | 10000 | True | P |
| ... | ... | ... | ... | ... |
| n | 0 | 2000 | False | NV |

Referring to the table 3, a start LBA and a length of a first partition PID1 are '0' and '5000', respectively. 'Writable' is set to 'False', and a write-protection type is 'P'. A start LBA and a length of a second partition PID2 are '0' and '4000', respectively. 'Writable' is set to 'True', and a write-protection type is NV-P'. That is, 'Writable' of a write-protection area LBA0 through LBA4000 of the second partition PID2 may be changed by a request of a host 3100, and 'Writable' is always changed to 'False' after power-off or hardware reset.

A start LBA and a length of a third partition PID3 are '9000' and '10000', respectively. 'Writable' is set to 'True and a write-protection type is 'P. A start LBA and a length of an n-th partition PIDn are '0' and '2000', respectively. 'Writable' is set to 'False', and a write-protection type is 'NV'. 'Writable' of the n-th partition PIDn may only be changed by a request of the host 3100.

The following table 4 shows an example where a WP descriptor has been is changed after power-off or hardware (HW) reset.

TABLE 4

| PID (Partition ID) | Start LBA | Length | Writable | Type |
|---|---|---|---|---|
| 1 | 0 | 5000 | True | P |
| 2 | 0 | 4000 | False | NV-P |
| 3 | 9000 | 10000 | True | P |
| ... | ... | ... | ... | ... |
| n | 0 | 2000 | False | NV |

Referring to the table 4, 'Writable' of the first partition PID1 is changed from 'False' to 'True' as compared to table 3. In the table 3, 'Writable' of a second partition PID2 is set to 'True'. At power-off or hardware reset, 'Writable' of the WP descriptor is changed from 'True' to 'False' because a write-protection type is 'NV-P'. 'Writable' of a third partition PID3 maintains 'True'. 'Writable' may be changed by a request of the host 3100 because a write-protection type of an n-th partition PIDn is 'NV'.

II. Request and Response for Write Protection Setting

In the inventive concepts, it is assumed that a host 3100 and a storage device 3200 share a private key in a safe way.

Figure 7:
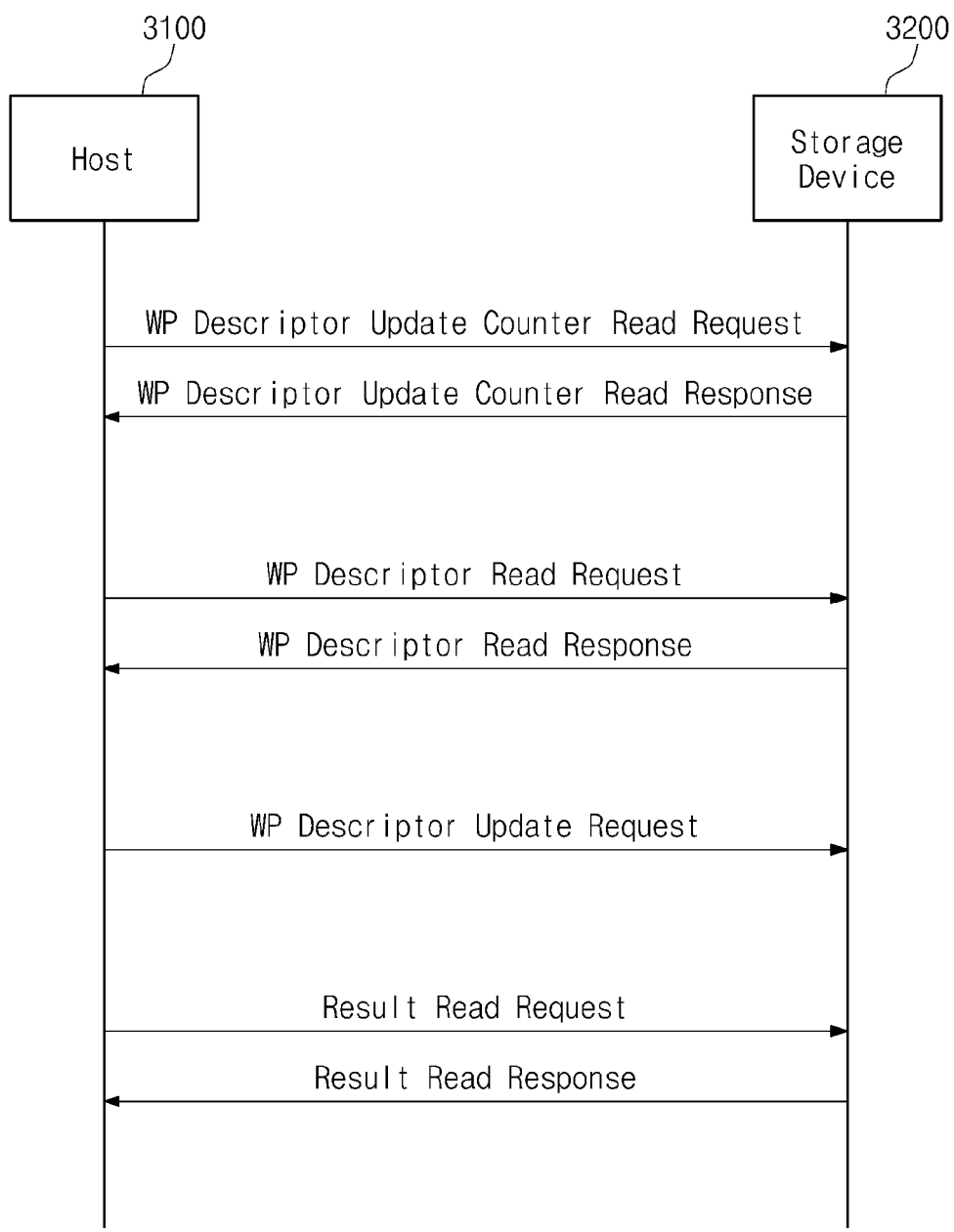
FIG. 7 is a timing diagram showing a request and a response for locking or unlocking write-protect of a storage system according to an embodiment of the inventive concepts.

FIG. 7 is a timing diagram showing a request and a response for setting or releasing write protection of a storage system according to an embodiment of the inventive concepts. Referring to FIG. 7, the host 3100 provides the storage device 3200 with a request for setting and releasing write protection. The storage device 3200 receives the request of the host 3100 and provides a response corresponding to the request.

Referring to FIG. 7, the host 3100 may provide the storage device 3200 with four types of requests to set and release write protection. That is, the host 3100 provides the storage device 3200 with a WP descriptor update counter read request, a WP descriptor read request, a WP descriptor update request, and a result read request.

The storage device 3200 provides the host 3100 with three types of responses in response to a request of the host 3100. That is, the storage device 3200 provides the host 3100 with a WP descriptor update counter read response, a WP descriptor read response, and a result read response. The host 3100 may receive responses from the storage device 3200 on remaining requests other than the WP descriptor update request.

The following table 5 shows a structure of a data frame for processing each request and response.

TABLE 5

| Name | Description |
|---|---|
| Request/ Response Type | Four request types for setting and releasing write protection and changing its configuration are as follows:<br>(1) 0x1: WP Descriptor Update Counter Read Request<br>(2) 0x2: WP Descriptor Read Request<br>(3) 0x3: WP Descriptor Update Request<br>(4) 0x4: Result Read Request<br>Three response types for setting and releasing write protection and changing its configuration are as follows:<br>(1) 0x5: WP Descriptor Update Counter Read Response<br>(2) 0x6: WP Descriptor Read Response<br>(3) 0x7: Result Read Response |
| WP Descriptor Update Counter | WP descriptor update counter requested up to now |
| Nonce | Random number for preventing replay attack |
| WP Descriptor | WP descriptor (Request Type = 0x3) to be applied<br>WP descriptor (Response Type = 0x6) applied |

TABLE 5-continued

| Name | Description |
| --- | --- |
| Result | Result on request Success or fail causes |
| HMAC | HMAC for checking whether or not of authenticated request |

The host 3100 provides the storage device 3200 with a data frame organized as illustrated in the table 5 to perform an operation corresponding to each request. Herein, results of the WP descriptor update counter read request and the WP descriptor read request may be checked through corresponding responses, respectively. In contrast, a result of the WP descriptor update request may be checked through the result read request.

Referring to the table 5, 'WP Descriptor Update Counter' means a counter value requested up to now. 'Nonce' is a random number for preventing replay attack. 'WP Descriptor' means a WP descriptor to be applied or a WP descriptor applied. 'Result' is a result on a request and provides whether a request succeeds or fails and a fail cause. 'HMAC' (Hash-based Message Authentication Code) is used to authenticate a request. The host 3100 calculates the HMAC for 'WP Descriptor Update Request' by means of a key and a message.

Figure 8:
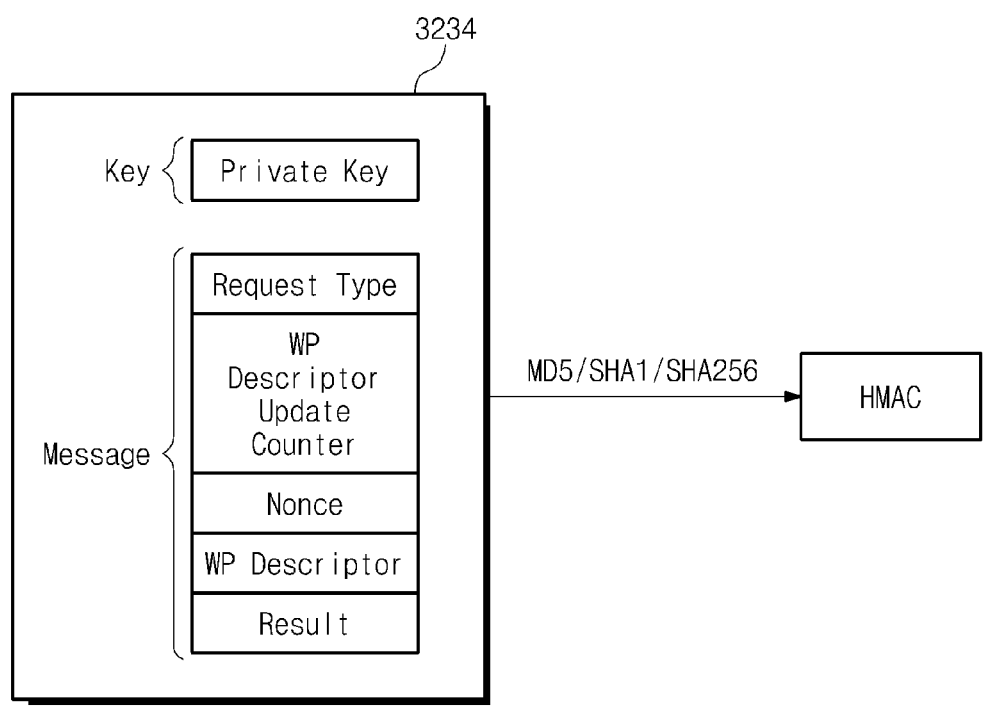
FIG. 8 is a conceptual diagram for describing a method of calculating a HMAC.

FIG. 8 is a conceptual diagram for describing a method of calculating HMAC. HMAC (Hash-based Message Authentication Code) may be calculated by a security manager 3234 shown in FIG. 12 of by the HMAC 3250. Referring to FIG. 8, the security manager 3234 calculates the HMAC by means of a private key and a message. The message contains 'Request Type', 'WP Descriptor Update Counter', 'Nonce', 'WP Descriptor', and 'Result'. The security manager 3234 calculates the HMAC by means of MD5, SHA1, SHA256, etc.

Below, requests and responses shown in FIG. 7 will be described.

1. WP Descriptor Update Counter Read Request/Response

A host 3100 requests a WP descriptor update counter, requested up to now, to set write protection. The host 3100 provides a storage device 3200 with a WP descriptor update counter read request to request how many times a WP descriptor has been updated.

The following table 6 shows a data frame of the WP descriptor update counter read request.

TABLE 6

| Name | Description |
| --- | --- |
| Request Type | 0x1 |
| WP Descriptor Update Counter | 0x0 |
| Nonce | Random number produced by host |
| WP Descriptor | 0x0 |
| Result | 0x0 |
| HMAC | 0x0 |

Referring to the table 6, 'Request Type' is '0x1', 'WP Descriptor Update Counter' is '0x0' (described below), and 'Nonce' is a random number that a host generates. The CPU in the host may include a random number generator. 'WP Descriptor' is '0x0', 'Result' is '0x0', and 'HMAC' is '0x0'.

The storage device 3200 provides the host 3100 with a response shown in the following table 7 in response to a request shown in the table 6. That is, the host 3100 reads a data frame organized as shown in the following table 7 and checks a current WP descriptor update counter.

TABLE 7

| Name | Description |
| --- | --- |
| Response Type | 0x5 |
| WP Descriptor Update Counter | Current value of mobile storage |
| Nonce | Random number generated by host |
| WP Descriptor | 0x0 |
| Result | Execution result of request |
| HMAC | HMAC calculated by mobile storage |

Referring to the table 7, 'Response Type' is '0x5', 'WP Descriptor Update Counter' denotes how many the storage device 3200 has updated the 'WP Descriptor'. The security manager 3234 may include a counter that is incremented each time the WP Descriptor is updated. 'Nonce' is a random number a host generates and is received in the request. 'WP Descriptor' is '0x0', 'Result' is a result of executing a request, and 'TIMAC' is a value calculated by a security manager 3234.

The storage device 3200 calculates 'HMAC' by means of values shown in the following table 8 when generating a data frame shown in the table 7.

TABLE 8

| Name | Description |
| --- | --- |
| Private Key | Shared private key |
| Response Type | 0x5 |
| WP Descriptor Update Counter | Current value of mobile storage |
| Nonce | Random number generated by host |
| WP Descriptor | 0x0 |
| Result | Execution result of request |

Referring to the table 8, 'Private Key' is a key the host 3100 and the storage device 3200 share (e.g., pre-stored in ROM 3230 during manufacture), 'Response Type' is '0x5', and 'WP Descriptor Update Counter' denotes how many the storage device times 3200 updates 'WP Descriptor' up to now. 'Nonce' is a random number a host generates, 'WP Descriptor' is '0x0', and 'Result' is a result of executing a request. The host 3100 reads a data frame and then calculates the HMAC. The host 3100 authenticates a response by means of the HMAC and checks a 'Nonce' value to prevent replay attack.

2. WP Descriptor Read Request

To set the write protection, the host 3100 reads a WP descriptor currently applied and then checks current setting and configuration. The host 3100 provides 'WP Descriptor Read Request' to the storage device 3200. The following table 9 shows a data frame for 'WP Descriptor Read Request',

TABLE 9

| Name | Description |
| --- | --- |
| Request Type | 0x2 |
| WP Descriptor Update Counter | 0x0 |
| Nonce | Random number generated by host |
| WP Descriptor | 0x0 |
| Result | 0x0 |
| HMAC | 0x0 |

Referring to the table 9, 'Request Type' is '0x2', 'WP Descriptor Update Counter' is '0x0', and 'Nonce' is a random number a host generates. 'WP Descriptor' is '0x0', 'Result' is '0x0', and 'HMAC' is '0x0'.

The storage device 3200 provides the host 3100 with a response shown in the following table 10 in response to a request shown in the table 9. The host 3100 reads a data frame shown in the table 10 and checks 'WP Descriptor'.

TABLE 10

| Name | Description |
| --- | --- |
| Response Type | 0x6 |
| WP Descriptor Update Counter | 0x0 |
| Nonce | Random number generated by host |
| WP Descriptor | Current value of mobile storage |
| Result | Execution result of request |
| HMAC | HMAC calculated by mobile storage in table 11 |

Referring to the table 11, 'Response Type' is '0x6', and 'WP Descriptor Update Counter' is '0x0'. 'Nonce' is a random number a host generates, 'WP Descriptor' is a current 'WP Descriptor' value of the storage device 3200, and 'Result' is a result of executing a request. 'HMAC' is a value a security manager 3234 or HMAC 3250 calculates.

The storage device 3200 calculates 'HMAC' by means of values shown in the following table 11 when generating a data frame shown in the table 10.

TABLE 11

| Name | Description |
| --- | --- |
| Private Key | Shared private key |
| Request Type | 0x6 |
| WP Descriptor Update Counter | 0x0 |
| Nonce | Random number generated by host |
| WP Descriptor | Current value of mobile storage |
| Result | Execution result of request |

Referring to the table 11, 'Private Key' is a key the host 3100 and the storage device 3200 share, 'Response Type' is '0x6', and 'WP Descriptor Update Counter' is '0x0'. 'Nonce' is a random number a host generates, 'WP Descriptor' is a current 'WP Descriptor' value of the storage device 3200, and 'Result' is a result of executing a request. A security manager 3234 or HMAC 3250 reads a data frame shown in the table 11 and then calculates the HMAC.

3. WP Descriptor Update Request

To newly set the write protection, the host 3100 newly configures 'WP Descriptor' to be applied and requests an update at the storage device 3200 by means of the WP descriptor thus configured. To request an update of 'WP Descriptor', the host 3100 generates the HMAC by means of input values shown in the following table 12.

TABLE 12

| Name | Description |
| --- | --- |
| Private Key | Shared private key |
| Request Type | 0x3 |
| WP Descriptor Update Counter | Current value of mobile storage |
| Nonce | 0x0 |
| WP Descriptor | Descriptor to be changed |
| Result | 0x0 |

Referring to the table 12, 'Private Key' is a key the host 3100 and the storage device 3200 share, 'Response Type' is '0x3', and 'WP Descriptor Update Counter' indicates how many the storage device 3200 updates 'WP Descriptor' up to now. 'Nonce' is a random number a host generates, 'WP Descriptor' is a 'WP Descriptor' value to be changed, and 'Result' is '0x0'.

The following table 13 shows a data frame for 'WP Descriptor Update Request'. The host 3100 provides the storage device 3200 with a data frame organized as illustrated in the table 13.

TABLE 13

| Name | Description |
| --- | --- |
| Request Type | 0x3 |
| WP Descriptor Update Counter | Current value of mobile storage |
| Nonce | 0x0 |
| WP Descriptor | Descriptor to be changed |
| Result | 0x0 |
| HMAC | HMAC calculated by host in table 12 |

Referring to the table 13, 'Response Type' is '0x3', and 'WP Descriptor Update Counter' indicates how many the storage device 3200 updates 'WP Descriptor' up to now. 'Nonce' is '0x0', 'WP Descriptor' is a value of 'WP Descriptor' to be changed, and 'Result' is '0x0'. 'HMAC' is a value the host 3100 calculates by means of a data frame shown in the table 12.

The host 3100 provides a data frame shown in the table 13 to the storage device 3200 to update 'WP Descriptor'. The storage device 3200 receives a WP descriptor update request, processes the request normally, and increases a WP descriptor update counter.

4. Result Read Request/Response

The host 3100 requests an update on 'WP Descriptor' and then uses 'Result Read Request' to check a result on the request. For the result read request, the host 3100 configures a data frame as illustrated in the following table 14 and then provides it to the storage device 3200.

TABLE 14

| Name | Description |
| --- | --- |
| Request Type | 0x4 |
| WP Descriptor Update Counter | 0x0 |
| Nonce | 0x0 |
| WP Descriptor | 0x0 |
| Result | 0x0 |
| HMAC | 0x0 |

Referring to the table 14, 'Response Type' is '0x4', and 'WP Descriptor Update Counter' is '0x0'. 'Nonce' is '0x0', WP Descriptor' is '0x0', and 'Result' is '0x0'. 'HMAC' is '0x0'. The storage device 3200 provides the host 3100 with a response shown in the following table 15 in response to a request shown in the table 14. The host 3100 reads a data frame shown in the table 15 and checks a result of updating 'WP Descriptor'.

TABLE 15

| Name | Description |
| --- | --- |
| Response Type | 0x7 |
| WP Descriptor Update Counter | Current value of mobile storage |
| Nonce | 0x0 |
| WP Descriptor | 0x0 |
| Result | Execution result of request |
| HMAC | HMAC calculated by mobile storage |

Referring to the table 15, 'Response Type' is '0x7', and 'WP Descriptor Update Counter' indicates how many the storage device 3200 updates 'WP Descriptor' up to now. 'Nonce' is '0x0', 'WP Descriptor' is '0x0', and 'Result' is a result of executing a request. 'HMAC' is a value the security manager 3234 calculates. The security manager 3234 or HMAC 3250 calculates 'HMAC' by means of values shown in the following table 16 when generating a data frame shown in the table 15.

TABLE 16

| Name | Description |
| --- | --- |
| Private Key | Shared private key |
| Response Type | 0x7 |
| WP Descriptor Update Counter | Current value of mobile storage |
| Nonce | 0x0 |
| WP Descriptor | 0x0 |
| Result | Execution result of request |

Referring to the table 16, 'Private Key' is a key the host 3100 and the storage device 3200 share, 'Response Type' is '0x7', and 'WP Descriptor Update Counter' indicates how many the storage device 3200 updates 'WP Descriptor' up to now. 'Nonce' is '0x0', 'WP Descriptor' is '0x0', and 'Result' is a result of executing a request. The host 3100 reads a data frame shown in the table 16 and calculates 'HMAC'.

III. Authentication of WP Descriptor Update Request

Figure 9:
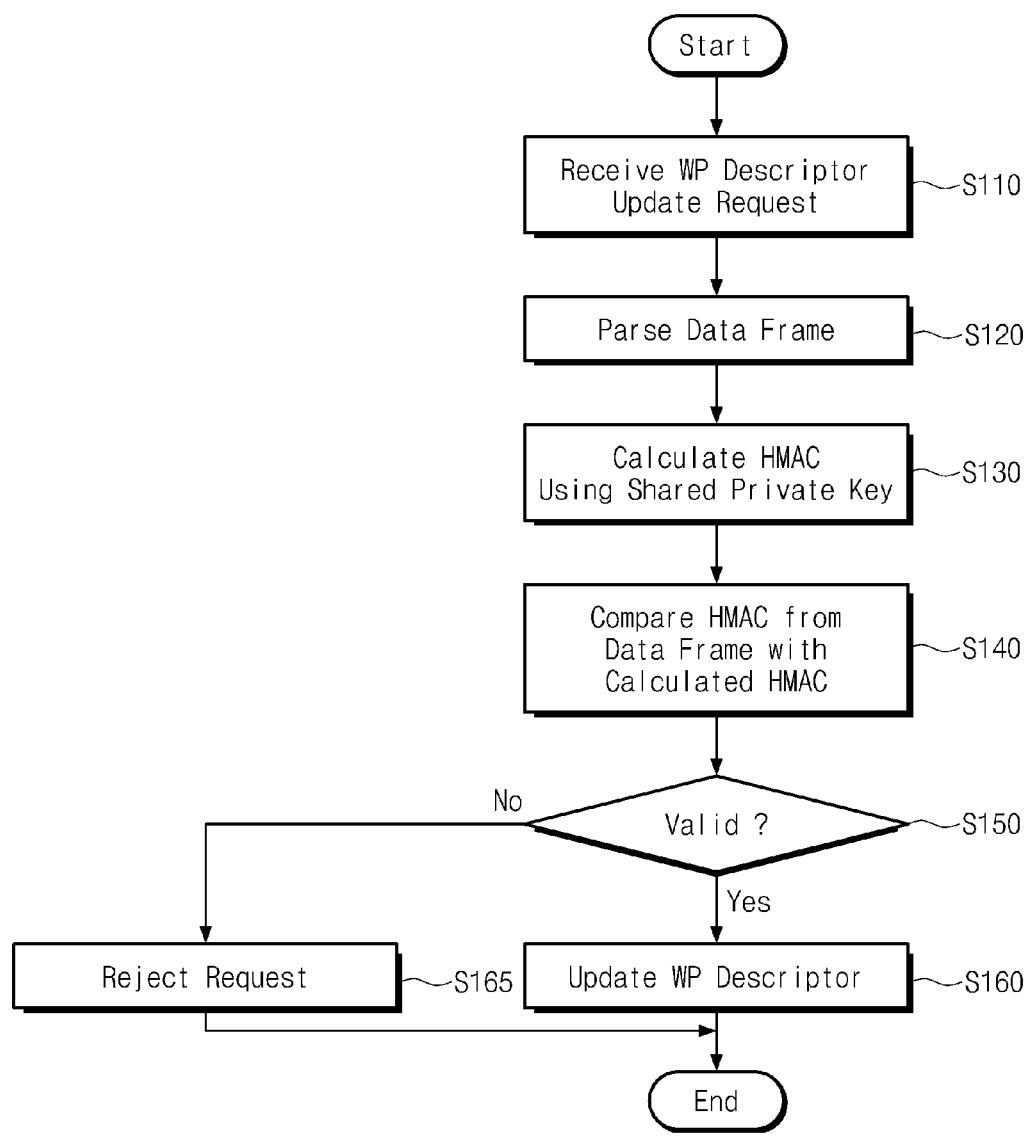
FIG. 9 is a flow chart schematically illustrating a HMAC authentication method of the storage system shown in FIG. 3.

FIG. 9 is a flow chart schematically illustrating an HMAC authentication method of a storage system shown in FIG. 3. FIG. 9 shows a method in which the storage device 3200 authenticates 'WP Descriptor Update Request'.

In step S110, a command manager 3232 of a storage device 3200 receives a WP descriptor update request from a host 3100. The storage device 3200 updates a write protection's setting in response to the WP descriptor update request. That is, the storage device 3200 newly configures a WP descriptor to be applied.

In step S120, the command manager 3232 parses a data frame of the WP descriptor update request. The above-described table 13 shows a data frame of the WP descriptor update request. Referring to the table 13, the data frame contains 'Request Type', 'WP Descriptor Update Counter', 'WP Descriptor', 'Nonce', 'Result', and 'HMAC'.

In step S130, a security manager 3234 of the storage device 3200 calculates the HMAC by means of a shared private key, which has been described with reference to FIG. 8. That is, the security manager 3234 calculates the HMAC by means of the private key and a message. The message may include 'Request Type', 'WP Descriptor Update Counter', 'Nonce', 'WP Descriptor', and 'Result'. The security manager 3234 may calculate the HMAC by means of MD5, SHA1, SHA256, etc. Alternatively, the HMAC 3250 calculates the HMAC and provides the result to the security manager 3234.

In step S140, the security manager 3234 compares HMAC, obtained from the data frame of the WP descriptor update request, with the HMAC calculated in step S130. As shown in the table 13, the data frame provided from a host 3100 includes 'HMAC'. The security manager 3234 authenticates the WP descriptor update request by comparing the HMAC from the host 3100 with HMAC the storage device 3200 calculates.

In step S150, the security manager 3234 determines whether the WP descriptor update request is valid, depending on a comparison result of step S140. If the HMAC from the host 3100 is equal to the HMAC calculated in the storage device 3200, the security manager 3234 determines that the WP descriptor update request is valid. If the HMAC from the host 3100 is different from the HMAC calculated in the storage device 3200, the security manager 3234 determines that the WP descriptor update request is invalid.

When the WP descriptor update request is valid, in step S160, the security manager 3234 updates the WP descriptor in response to the WP descriptor update request. When the WP descriptor update request is invalid, in step S165, the security manager 3234 rejects the WP descriptor update request.

IV. Execution of Write-Protection

Figure 10:
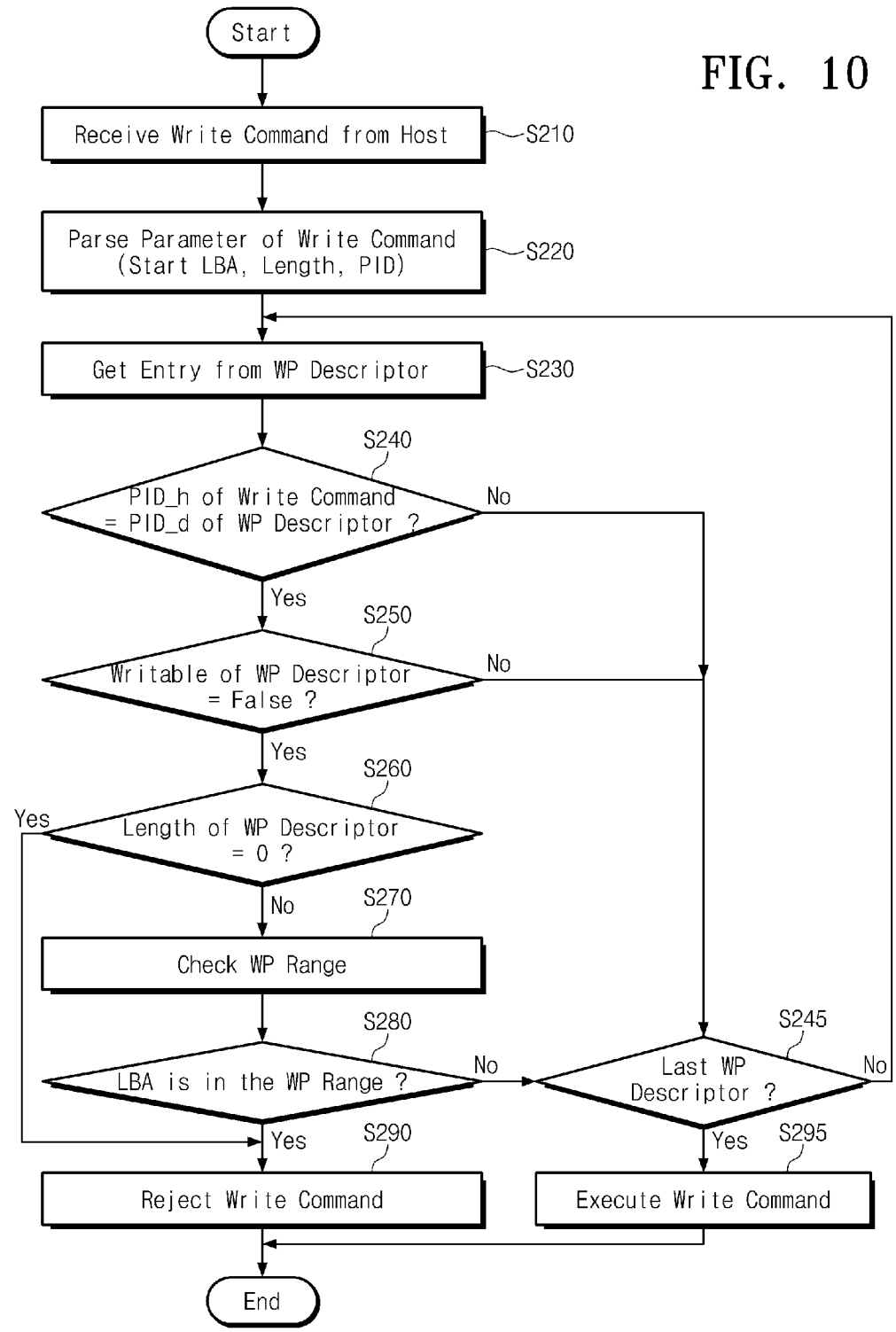
FIG. 10 is a flow chart for describing a write-protection execution method of the storage system shown in FIG. 3.

FIG. 10 is a flow chart for describing a write-protection execution method of a storage system shown in FIG. 3. When receiving a write command or an erase command from a host 3100, a storage device 3200 performs or prevents an operation of writing data at an address area, depending on whether write protection is executed.

In step S210, a command manager 3232 of the storage device 3200 receives a write command from the host 3100. In step S220, the command manager 3232 parses a parameter of the write command. The parameter of the write command may contain a start LBA, a length, and a partition ID (PID). In step S230, a security manager 3234 of the storage device 3200 fetches sdA from a WP descriptor.

In step S240, the security manager 3234 compares a partition ID PID_h of the write command with a partition ID PID_d of the WP Descriptor. 'PID_h' comes from the host 3100, and 'PID_d' results from the storage device 3200. The security manager 3234 determines whether the partition ID PID_h of the write command is equal to the partition ID PID_d of the WP descriptor.

When the partition ID PID_h of the write command is different from the partition ID PID_d of the WP descriptor, in step S245, there is determined whether the WP descriptor is the last WP descriptor. When the WP descriptor is not the last, the method proceeds to step S230 and the next WP descriptor is obtained. When the WP descriptor is the last, the method proceeds to step S295, in which the write command is executed.

Returning to step S250, when the partition ID PID_h of the write command is equal to the partition ID PID_d of the WP descriptor, the method proceeds to step S250, in which the security manager 3234 checks 'Writable' of the WP descriptor. For example, the security manager 3234 determines whether 'Writable' of the WP descriptor is set to 'False'. When 'Writable' of the WP Descriptor is not set to 'False', the method proceeds to step S245.

When 'Writable' of the WP descriptor is set to 'False', in step S260, the storage device 3200 checks a length of the WP descriptor. The storage device 3200 checks whether the length of the WP descriptor is set to '0'. If so, in step S290, the storage device 3200 rejects the write command. As described with reference to a table 1, that the length of the WP descriptor is set to '0' means that the whole partition is write-protected.

When the length of the WP descriptor is not set to '0', in step S270, the security manager 3234 checks a write-protection range indicated by the start LBA and length of the WP descriptor.

In step S280, the security manager 3234 determines whether the logical block address LBA in the write command is in the write-protection range. When the logical block address LBA in the write command is out of the write-protection range, the method proceeds to step S245.

When the logical block address LBA of the write command is in the write-protection range, in step S290, the storage device 3200 rejects the write command. That is, the storage device 3200 write-protects a memory area corresponding to the logical block address LBA and length in the WP descriptor.

Figure 11:
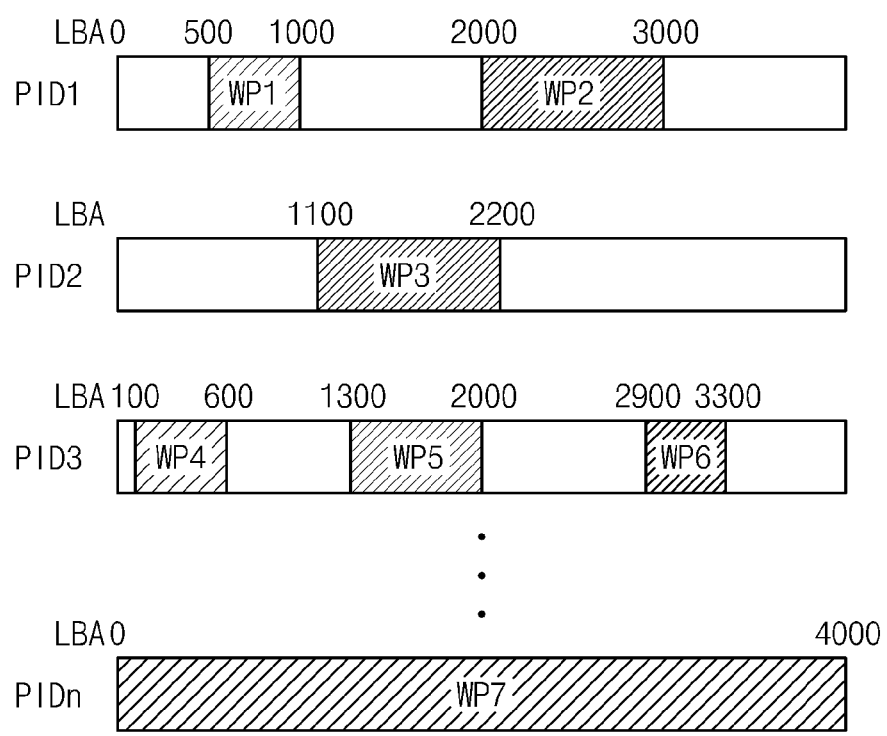
FIG. 11 is a conceptual diagram schematically illustrating an embodiment in which one or more areas of a storage system according to an embodiment of the inventive concepts are write-protected.

FIG. 11 is a conceptual diagram schematically illustrating an embodiment in which one or more memory areas of a storage system according to an embodiment of the inventive concepts are write-protected. In a storage system 3000 shown in FIG. 3, one or more areas of one partition may be write-protected. Alternatively, a plurality of areas in a plurality of partitions may be write-protected. Referring to FIG. 11, a first partition PID1 includes two write-protected areas. A first write-protected area WP1 is from LBA500 to LBA1000, and a second write-protected area WP2 is from LBA2000 to LBA3000. A second partition PID2 includes one write-protected area. A third write-protected area WP3 is from LBA1100 to LBA2200. A third partition PID3 includes three write-protected areas. A fourth write-protected area WP4 is from LBA100 to LBA600, a fifth write-protected area WP5 from LBA1300 to LBA2000, and a sixth write-protected area WP6 from LBA2900 to LBA3300. The whole of an n-th partition PIDn is write-protected. An LBA allocation way of the WP descriptor may be changed to set a plurality of write-protected areas at one partition.

A storage system according to an embodiment of the inventive concepts relates to a write protection method using 'Key-ed Crypto Hash'. For example, HMAC is a form of 'Key-ed Crypto Hash'. If a command is authenticated by means of the 'Key-ed Crypto Hash', a change in a setting of the write protection may be only made by a host that has a private key shared with the storage device, thereby making it possible to prevent data from being changed by an unauthenticated host. Also, the storage system according to an embodiment of the inventive concepts authenticates a command and simultaneously sets a memory area to be write-protected by the logical block address.

In the inventive concepts, the setting of the write protection is accomplished through authentication that is performed using 'Key-ed Crypto Hash', 'Private Key', 'Request Count', and so on, and a write-protection area is set by a unit of a logical block address of a host. Also, it is possible to check an unintended change in data by preventing an unauthenticated host from setting the write protection. In addition, the host conducts the write protection dynamically and flexibly by changing a write-protection area by the logical block address.

Meanwhile, the storage system according to an embodiment of the inventive concepts is applicable to a variety of products. The storage system according to an embodiment of the inventive concepts may be implemented in electronic devices, such as a personal computer, a digital camera, a camcorder, a handheld telephone, an MP3 player, a Portable Media Player (PMP), a PlayStation Player (PSP), and a Personal Digital Assistant (PDA). A storage medium of the storage system may be implemented with storage devices, such as a memory card, a USB memory, and a Solid State Drive (SSD).

Figure 14:
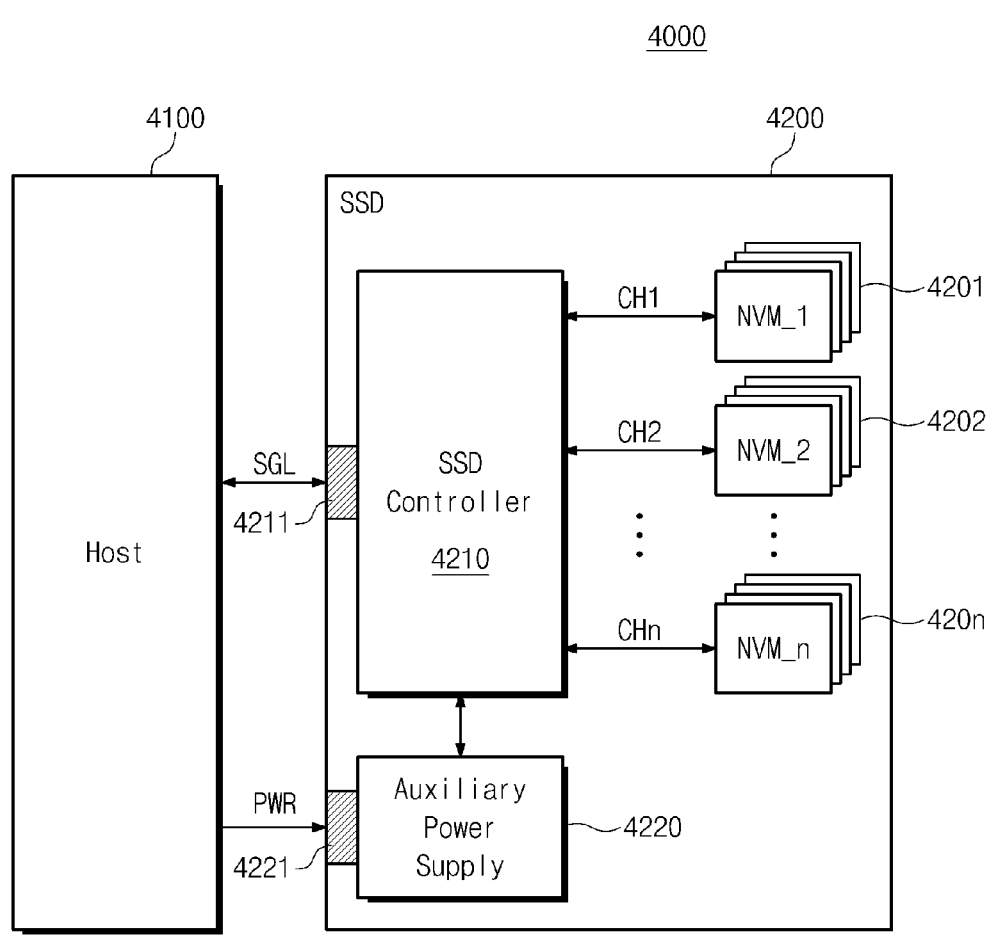
FIG. 14 is a block diagram illustrating a solid state drive to which a storage device according to the inventive concepts is applied.

FIG. 14 is a block diagram illustrating a solid state drive to which a storage device according to the inventive concepts is applied. Referring to FIG. 14, a solid state drive (SSD) system 4000 includes a host 4100 and an SSD 4200.

The SSD 4200 exchanges signals SGL with the host 4100 through a signal connector 4211 and is supplied with power through a power connector 4221. The SSD 4200 includes a plurality of flash memories 4201 through 420n, an SSD controller 4210, and an auxiliary power supply 4220.

The plurality of flash memories 4201 through 420n may be used as a storage medium of the SSD 4200. Not only may the SSD 4200 employ the flash memory, but it may employ nonvolatile memory devices, such as (Phase Change Random Access Memory (RAM)) PRAM, (Magnetoresistive RAM) MRAM, (Resistive RAM) ReRAM, and (Ferroelectric RAM) FRAM. The flash memories 4201 through 420n are connected with the SSD controller 4210 through a plurality of channels CH1 through CHn. One channel is connected with one or more flash memories. Flash memories connected with one channel may be connected with the same data bus.

The SSD controller 4210 exchanges signals SGL with the host 4100 through the signal connector 4211. The signals SGL may include the following: a command, an address, and data. The SSD controller 4210 is adapted to write or read out data to or from a corresponding flash memory in response to a command of the host 4100. The SSD controller 4210 will be more fully described with reference to FIG. 15.

The auxiliary power supply 4220 is connected with the host 4100 through the power connector 4221. The auxiliary power supply 4220 is charged by a power PWR from the host 4100. The auxiliary power supply 4220 may be placed inside or outside the SSD 4200. For example, the auxiliary power supply 4220 may be put on a main board to supply an auxiliary power to the SSD 4200.

Figure 15:
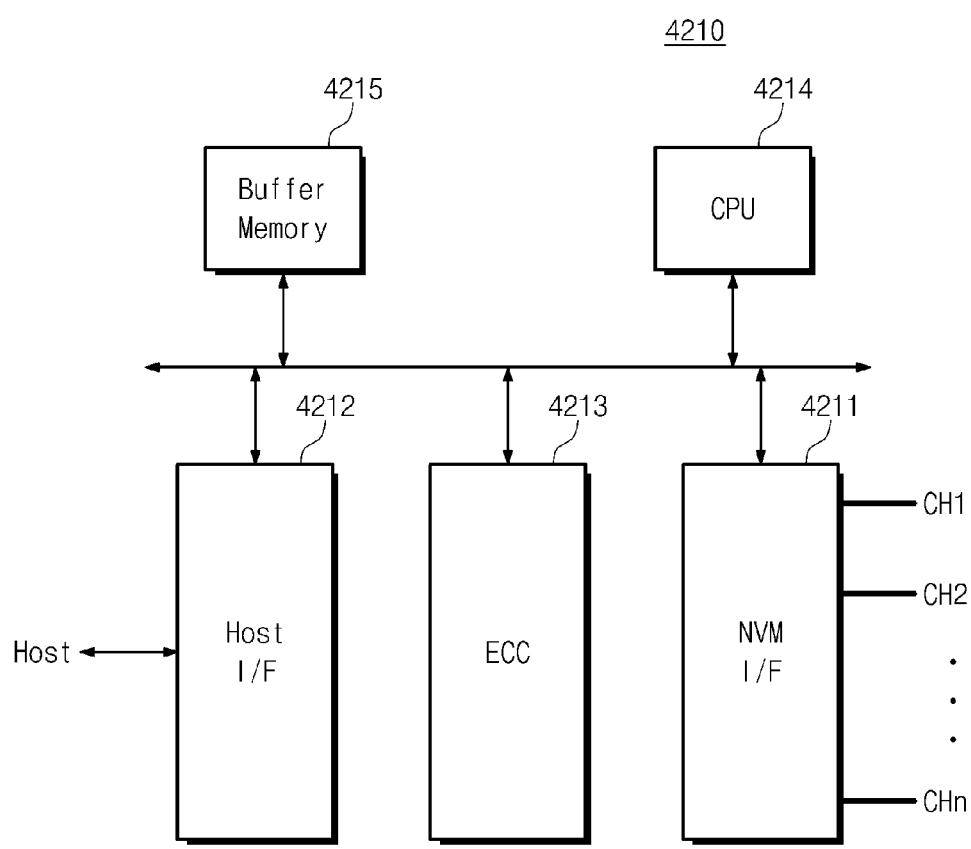
FIG. 15 is a block diagram schematically illustrating the SSD controller shown in FIG. 14.

FIG. 15 is a block diagram schematically illustrating an SSD controller shown in FIG. 14. Referring to FIG. 15, an SSD controller 4210 includes a (non-volatile memory) NVM interface 4211, a host interface 4212, an ECC circuit 4213, a central processing unit (CPU) 4214, and a buffer memory 4215.

The NVM interface 4211 may scatter data transferred from the buffer memory 4215 into channels CH1 through CHn. The NVM interface 4211 transmits data read from flash memories 4201 through 420n to the buffer memory 4215. The NVM interface 4211 may use a flash memory interface manner, for example. That is, the SSD controller 4210 may perform a read, a write, and an erase operation in the flash memory interface manner.

The host interface 4212 may provide an interface with an SSD 4200 in compliance with the protocol of the host 4100. The host interface 4212 may communicate with the host 4100 by means of USB (Universal Serial Bus), SCSI (Small Computer System Interface), PCI express, ATA, PATA (Parallel ATA), SATA (Serial ATA), SAS (Serial Attached SCSI), and so on. The host interface 4212 may also perform disk emulation which enables the host 4100 to recognize the SSD 4200 as a hard disk drive (HDD).

The ECC circuit 4213 generates an error correction code ECC by means of data transferred to the flash memory 4201 through 420n. The error correction code ECC thus generated is stored at spare areas of the flash memory 4201 through 420n. The ECC circuit 4213 detects an error of data read from the flash memory 4201 through 420n. If the detected error is correctable, the ECC circuit 4213 may correct the detected error.

The CPU 4214 analyzes and processes signals received from a host 4100 (refer to FIG. 14). The CPU 4214 controls the host 4100 through the host interface 4212 or the flash memories 4201 through 420n through the NVM interface 4211. The CPU 4214 controls the flash memories 4201 through 420n by means of firmware for driving an SSD 4200.

The buffer memory 4215 temporarily stores write data provided from the host 4100 or data read from a flash memory. Also, the buffer memory 4215 stores metadata to be stored in the flash memories 4201 through 420n or cache data. At sudden power-off, the metadata or cache data stored at the buffer memory 4215 is stored in the flash memories 4201 through 420n. The buffer memory 4215 may be implemented with a DRAM, an SRAM, and so on.

Figure 16:
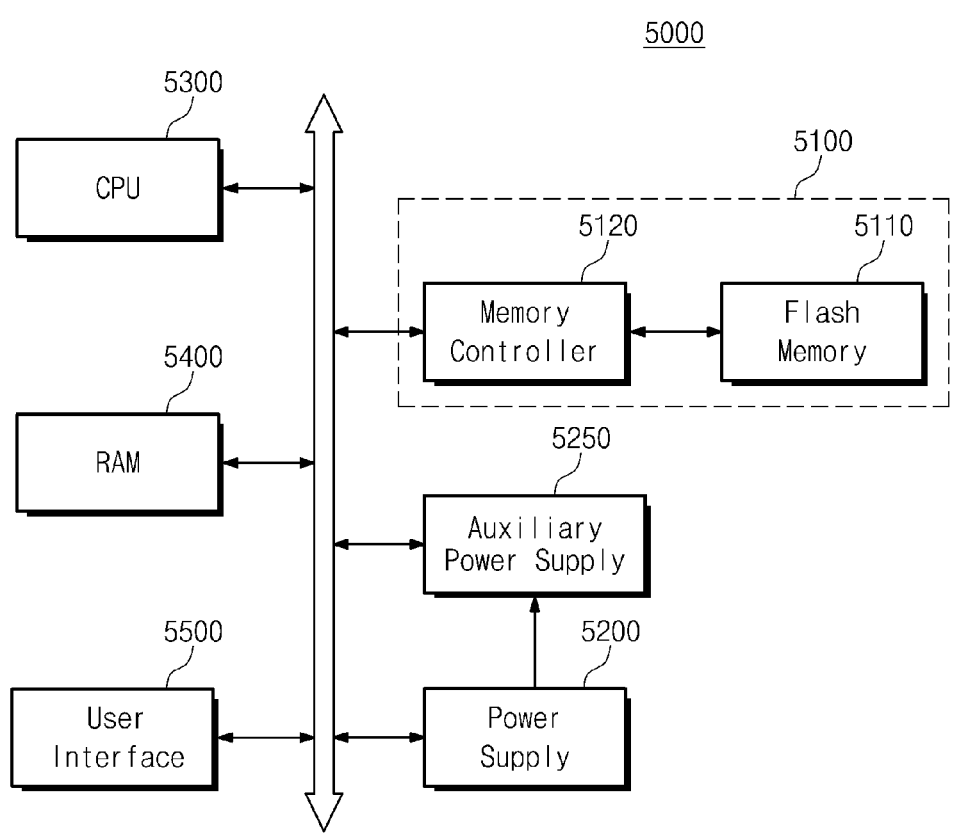
FIG. 16 is a block diagram schematically illustrating an electronic device including a storage device according to an embodiment of the inventive concepts.

FIG. 16 is a block diagram schematically illustrating an electronic device including a storage device according to an embodiment of the inventive concepts. An electronic device 5000 may be implemented with a personal computer or with handheld electronic devices, such as a notebook computer, a cellular phone, a PDA, and a camera.

Referring to FIG. 16, the electronic device 5000 includes a memory system 5100, a power supply 5200, an auxiliary power supply 5250, a central processing unit (CPU) 5300, a random access memory (RAM) 5400, and a user interface 5500. The memory system 5100 contains a flash memory 5110 and a memory controller 5120.

Figure 17:
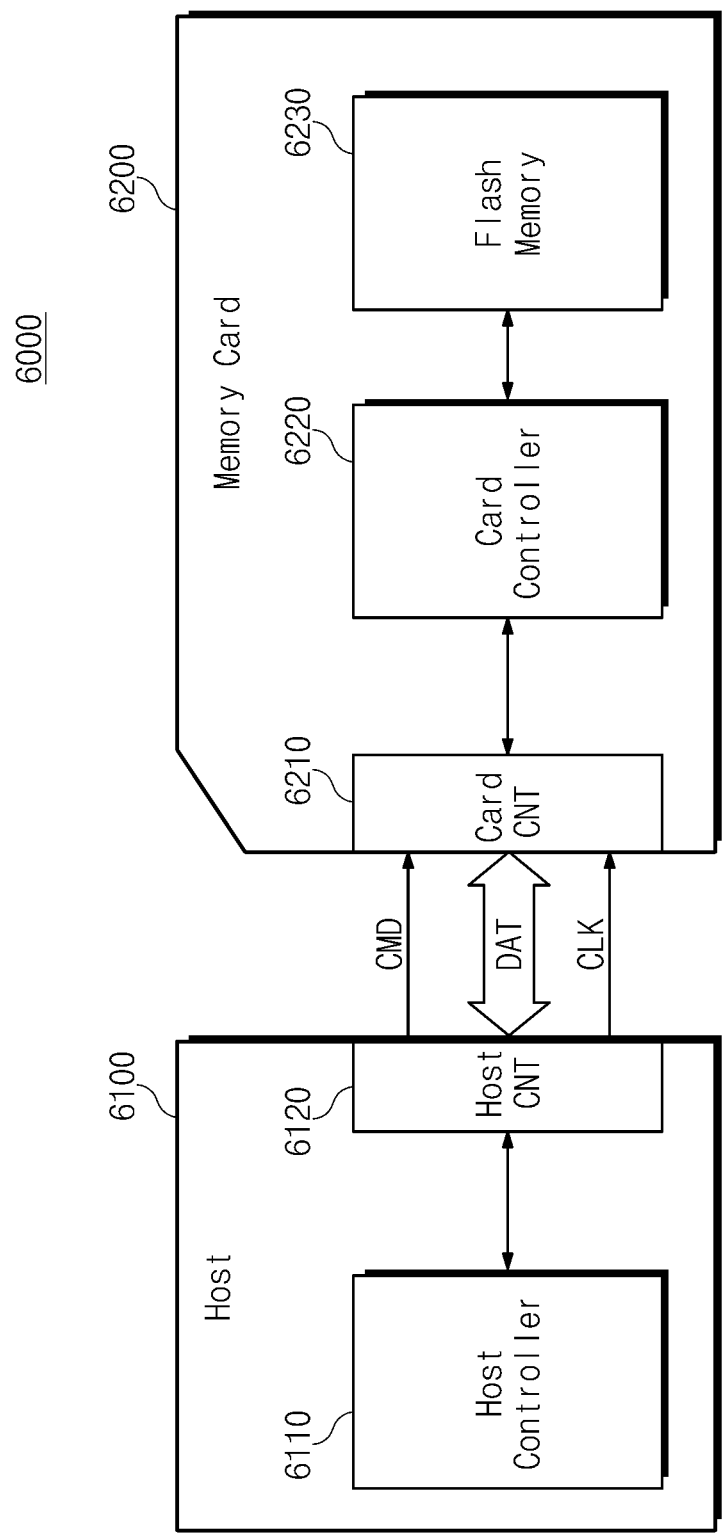
FIG. 17 is a block diagram schematically illustrating a memory card to which a storage device of a user device according to an embodiment of the inventive concepts is applied.

FIG. 17 is a block diagram schematically illustrating a memory card to which a storage device of a user device according to an embodiment of the inventive concepts is applied. A memory card system 6000 includes a host 6100 and a memory card 6200. The host 6100 contains a host controller 6110 and a host connection unit 6120. The memory card 6200 includes a card connection unit 6210, a card controller 6220, and a flash memory 6230.

The host 6100 writes data at the memory card 6200 and reads data from the memory card 6200. The host controller 6110 provides the memory card 6200 with a command (e.g., a write command), a clock signal CLK generated from a clock generator (not shown) in the host 6100, and data through the host connection unit 6120.

The card controller 6220 stores data at the flash memory 6230 in response to a command input through the card connection unit 6210. The data is stored in synchronization with a clock signal generated from a clock generator (not shown) in the card controller 6220. The flash memory 6230 stores data transferred from the host 6100. For example, if the host 6100 is a digital camera, the memory card 6200 may store image data.

While the inventive concepts has been described with reference to example embodiments, it will be apparent to those skilled in the art that various changes and modifications may be made without departing from the spirit and scope of the inventive concepts. For example, the scope of the inventive concepts may not be limited to a flash memory device. The inventive concepts may be applied to all storage devices that convert addresses by means of a translation layer. Therefore, it should be understood that the above embodiments are not limiting, but illustrative.

What is claimed is:

1. A storage device, comprising:
a first memory, the first memory being a non-volatile memory; and
a second memory configured to store a write-protect descriptor, the write-protect descriptor including a memory partition identifier identifying a partition of the first memory, start address information indicating a logical block address for a memory area in the identified memory partition, length information indicating a length of the memory area in the identified memory partition, writable information in association with the start address information and the length information, the writable information indicating whether to apply write protection to the memory area, and a field indicating a kind of write-protection to apply to the memory area in response to a power-off, a hardware reset, a power-on, and/or a request, a value of the field being one of at least,
a first write-protection value indicating that the writable information is changed to a first value after a powering on of the storage device, the first value indicating that the memory area is writable,
a second write-protection value indicating that the writable information is changed to a second value after a powering off or a hardware reset of the storage device, the second value indicating that the memory area is protected against writing,
and a third write-protection value indicating that the writable information may be changed by the request.

2. A method, comprising:
receiving, at a storage device, a request, the request including a request message authentication code, writable information, and write protect information, the write protect information including at least one of start address information, length information, writeable information indicating whether to apply write protection to a memory area, and a field indicating a kind of write-protection to apply to the memory area in response to a power-off, a hardware reset, a power-on, and a request, a value of the field being one of at least,
a first write-protection value indicating that the writable information is changed to a first value after a powering on of the storage device, the first value indicating that the memory area is writable,
a second write-protection value indicating that the writable information is always changed to a second value after a powering off or a hardware reset of the storage device, the second value indicating that the memory area is protected against writing,
and a third write-protection value indicating that the writable information is changeable by the request,
the start address information indicating a logical block address at which a memory area in a non-volatile memory of the storage device starts, and the length information indicating a length of the memory area; and
generating, at the storage device, a generated message authentication code based on (1) at least one of the start address information and the length information, and (2) a key stored at the storage device;
authenticating, at the storage device, the request based on the generated message authentication code and the request message authentication code; and
processing, at the storage device, the request based on a result of the authenticating.

3. The method of claim 2, wherein
the write protection information includes both the start address information and the length information; and
the generating generates the generated message authentication code based on the start address information, the length information and the key.

4. The method of claim 3, wherein
the write protection information includes the start address information, the length information and a partition identifier, the partition identifier identifying a partition in the non-volatile memory of the storage device, the partition including the memory area; and
the generating generates the generated message authentication code based on the start address information, the length information, the partition identifier and the key.

5. The method of claim 3, wherein
the write protection information includes the start address information, the length information, a partition identifier identifying a partition in the non-volatile memory of the storage device, the partition including the memory area, and the writable information indicating whether to apply write protection to the memory area; and
the generating generates the generated message authentication code based on the start address information, the length information, the partition identifier, the writable information and the key.

6. The method of claim 5, wherein
the write protection information includes the start address information, the length information, the partition identifier, the writable information, and field indicating a kind of write-protection to apply to the memory area; and
the generating generates the generated message authentication code based on the start address information, the length information, the partition identifier, the writable information, the field and the key.

7. The method of claim 2, wherein the generating generates a hash-based message authentication code.

8. The method of claim 2, wherein
the authenticating authenticates the request if the generated message authentication code matches the request message authentication code; and
the processing processes the request if the request is authenticated.

9. The method of claim 2, wherein the request requests the storage device to update the write protection information with information included in the request.

10. The method of claim 9, wherein the processing comprises:
incrementing an update counter if the processing processes the request; and
sending a response message if the processing processes the request, the response message including a count value of the update counter.

11. The method of claim 2, wherein the processing comprises:
sending a response message in response to the request if the processing processes the request.

12. The method of claim 2, wherein the processing comprises:
storing the write protection information.

13. A method, comprising:
receiving, at a storage device, a write command to write data to a first area of a non-volatile memory in the storage device; and
determining, at the storage device, whether to process the write command based on stored write protection information for one or more memory areas covered by the first area, for each memory area, the write protection information including,
start address information indicating a logical block address of a start of the memory area,
length information indicating a length of the memory area,
writable information indicating whether to apply write protection to the memory area, and
a field indicating a kind of write-protection to apply to the memory area in response to a power-off, a hardware reset, a power-on, and a request, a value of the field being one of at least,
a first write-protection value indicating that the writable information is changed to a first value after a powering on of the storage device, the first value indicating that the memory area is writable,
a second write-protection value indicating that the writable information is always changed to a second value after a powering off or a hardware reset of the storage device, the second value indicating that the memory area is protected against writing,
and a third write-protection value indicating that the writable information is changeable by a request.

14. The method of claim 13, wherein the determining determines not to process the write command if the first area overlaps one of the memory areas having associated writable information indicating to apply write protection.

15. The method of claim 13, wherein the determining determines the first area overlaps one of the memory areas if an address associated with the write command falls within one of the memory areas.

16. The method of claim 13, wherein
for each memory area, the write protection information further includes,
a partition identifier, the partition identifier identifying a partition in the non-volatile memory, the partition including the memory area; and
if the length information is set to a reference value, the length information indicates an entirety of the identified partition is write protected; and
the determining determines not to process the write command if the first area overlaps one of the memory areas having associated length information set to the reference value.

17. A storage device, comprising:
a non-volatile memory; and
a controller configured to receive a request, the request including a request message authentication code and write protect information, the write protect information including at least one of start address information and length information, the start address information indicating a logical block address at which a memory area of the non-volatile memory starts, and the length information indicating a length of the memory area, the write protect information including writable information indicating whether to apply write protection, and the write protect information including a field indicating a kind of write-protection to apply to the memory area in response to a power-off, a hardware reset, a power-on, and a request, a value of the field being one of at least,
a first write-protection value indicating that the writable information is changed to a first value after a powering on of the storage device, the first value indicating that the memory area is writable,
a second write-protection value indicating that the writable information is always changed to a second value after a powering off or a hardware reset of the storage device, the second value indicating that the memory area is protected against writing,
and a third write-protection value indicating that the writable information is changeable by the request;
the controller configured to generate a message authentication code based on (1) at least one of the start address information and the length information, and (2) a key stored at the storage device;
the controller configured to authenticate the request based on the generated message authentication code and the request message authentication code; and the controller configured to process the request based on a result of the authenticating.

18. A storage device, comprising:
a non-volatile memory; and
a controller configured to receive a write command to write data to a first area of the non-volatile memory in the storage device, and to determine whether to process the write command based on stored write protection information for one or more memory areas covered by the first area, for each memory area, the write protection information including,
start address information indicating a logical block address of a start of the memory area,
length information indicating a length of the memory area,
writable information indicating whether to apply write protection to the memory area, and
a field indicating a kind of write-protection to apply to the memory area in response to a power-off, a hardware reset, a power-on, and a request, a value of the field being one of at least
a first write-protection value indicating that the writable information is changed to a first value after a powering on of the storage device, the first value indicating that the memory area is writable,
a second write-protection value indicating that the writable information is always changed to a second value after a powering off or a hardware reset of the storage device, the second value indicating that the memory area is protected against writing,
and a third write-protection value indicating that the writable information is changeable by a request.

* * * * *